United States Patent [19]

Jones, Jr. et al.

[11] Patent Number: 5,263,148
[45] Date of Patent: Nov. 16, 1993

[54] METHOD AND APPARATUS FOR CONFIGURATION OF COMPUTER SYSTEM AND CIRCUIT BOARDS

[75] Inventors: Curtis R. Jones, Jr., Cypress; Robert S. Gready, Houston; Roberta A. Walton, Houston; Scott C. Farrand, Houston; Pamela H. Williams, Houston; Beatrice D. Pipes, Houston; Montgomery C. McGraw, Spring; Daryl D. George; Michael R. Griffin, both of Houston, all of Tex.

[73] Assignee: Compaq Computer Corporation, Houston, Tex.

[21] Appl. No.: 293,315

[22] Filed: Jan. 4, 1989

Related U.S. Application Data

[63] Continuation-in-part of Ser. No. 242,734, Sep. 9, 1988, abandoned.

[51] Int. Cl.$^5$ .............................................. G06F 12/00
[52] U.S. Cl. ................................. 395/500; 364/280.2; 364/280; 364/242.3; 364/282.1; 364/DIG. 1; 395/700
[58] Field of Search ... 364/200 MS File, 900 MS File; 395/500, 700

[56] References Cited

U.S. PATENT DOCUMENTS

| | | | |
|---|---|---|---|
| 3,680,052 | 7/1972 | Arulpragasam et al. | 364/200 |
| 4,070,704 | 1/1978 | Calle et al. | 364/200 |
| 4,250,563 | 2/1981 | Struger | 364/900 |
| 4,368,514 | 1/1983 | Persaud | 364/200 |
| 4,403,303 | 9/1983 | Howes | 364/900 |
| 4,562,535 | 12/1985 | Vincent et al. | 364/200 |
| 4,622,633 | 11/1986 | Ceccon | 364/200 |
| 4,635,192 | 12/1985 | Ceccon et al. | 364/200 |
| 4,750,136 | 6/1988 | Arpin et al. | 364/200 |
| 4,862,355 | 8/1989 | Newman et al. | 364/200 |
| 4,931,923 | 6/1990 | Fitch | 364/200 |

FOREIGN PATENT DOCUMENTS 83111761.9 11/1983 European Pat. Off. .
88103609.9 3/1988 European Pat. Off. .

OTHER PUBLICATIONS

NuBus-a Simple 32-Bit Backplane Bus, P1196 Specification, Draft 2.0, IEEE, Dec. 15, 1986.
IBM Corp., Personal System/2 Model 80 Technical Reference, First Edition, Apr. 1987, pp. 2-51 to 2-63.
IBM Corp., Supplements for the PS/2 Model 70, Hardware Interface, and BIOS Interface Technical References, PS/2 Model 70 Programmable Option Select section, pp. i to 57, Sep. 1988.
EISA Press Release, Sep. 13, 1988.
PC Magazine, The Great Divide-EISA vs. MicroChannel, pp. 165-186, Dec. 27, 1988.

*Primary Examiner*—Lawrence E. Anderson
*Assistant Examiner*—Eric Coleman
*Attorney, Agent, or Firm*—Pravel, Hewitt, Kimball & Krieger

[57] ABSTRACT

A method and apparatus for determining and selecting configuration options and settings of circuit boards used in a computer system is disclosed. The options and settings are placed in a file according to a given format, at which time the system determines if non-conflicting use of the common system resources is possible. If so, these option and setting parameters are used to configure the circuit boards.

9 Claims, 13 Drawing Sheets

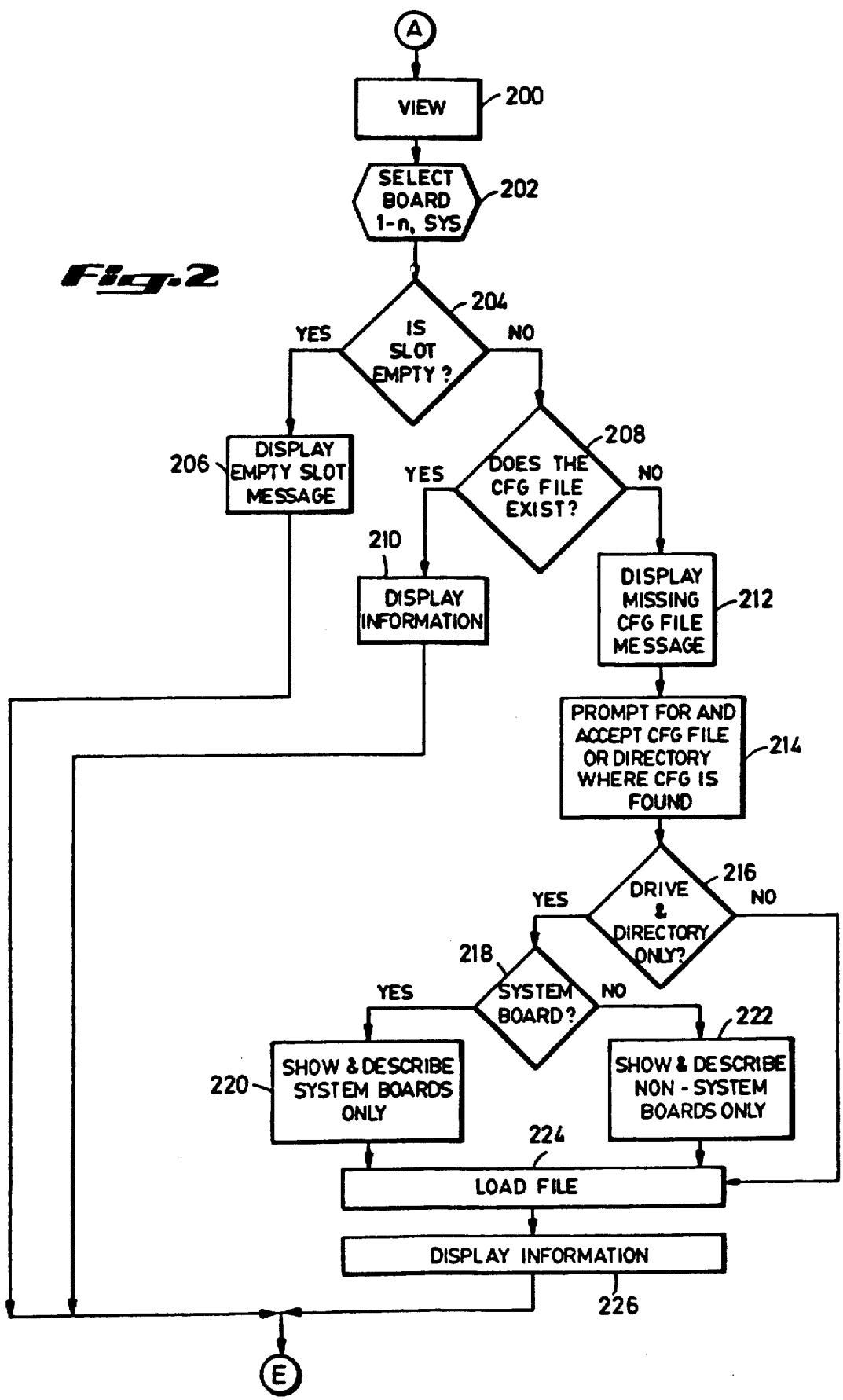

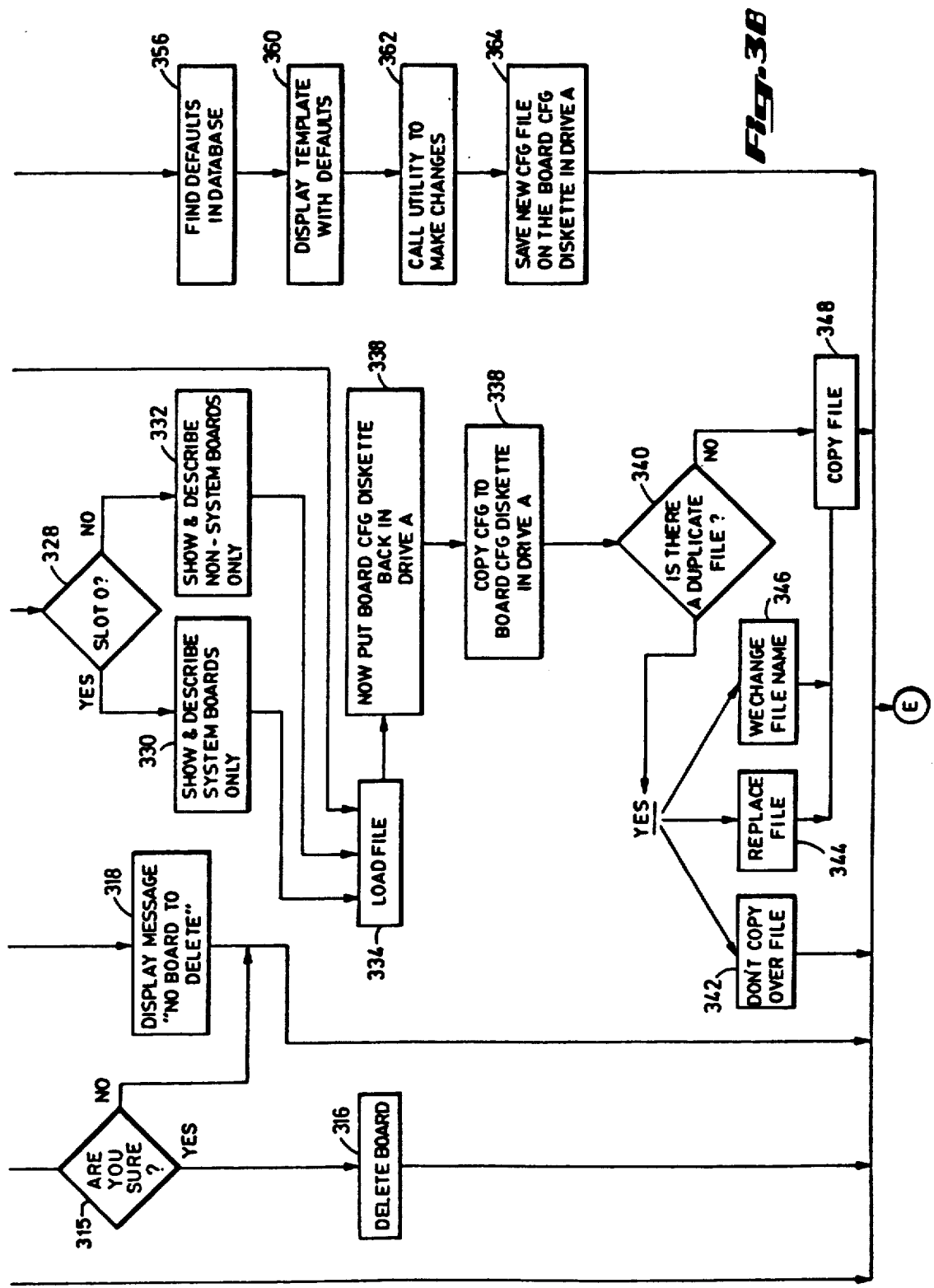

ADAPTER BOARD ORIENTATION

FIG. 7B  NORMAL SWITCH: 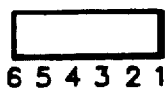
REVERSE SWITCH:  
FIG. 7D  NORMAL VERTICAL SWITCH: 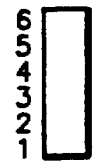
REVERSE VERTICAL SWITCH:  
FIG. 7F  PAIRED JUMPER (NORMAL): 
FIG. 7G  TRIPOLE JUMPER (REVERSE): 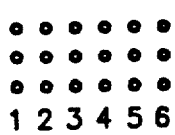
TRIPOLE JUMPER (REVERSE, VERTICAL):  
FIG. 7I  INLINE JUMPER (REVERSE): 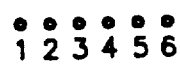

METHOD AND APPARATUS FOR CONFIGURATION OF COMPUTER SYSTEM AND CIRCUIT BOARDS

This is a continuation-in-part of copending application Ser. No. 242,734, filed Sep. 9, 1988, now abandoned.

BACKGROUND OF THE INVENTION

1. Field of the Invention

The present invention relates to computer systems having interchangeable circuit boards and more particularly to configuration of the circuit boards for use in a particular computer system.

2. Description of the Prior Art

Microprocessors with enhanced speed and size have made it possible to develop and utilize a variety of sophisticated memory and input/output devices located on circuit boards. The use of interchangeable circuit boards has allowed lower cost, highly flexible computer systems to be developed. A desired basic computer system including a microprocessor and a system board containing connectors for receiving the circuit boards is obtained by the user. The user then adds the desired circuit boards having the desired memory and input/output features of the completed computer systems. In this way individualized computer systems can be easily and efficiently developed.

The circuit boards associated with the sophisticated memory and input/output devices make complex demands on the computer system resources, particularly of the limited common computer resources such as interrupt request lines, direct memory access (DMA) channels and input/output and memory address space. Additionally, the circuit boards often require internal initialization or the selection of internal options to meet the desired conditions.

Configuring a variety of circuit boards in one computer system leads to potential configuration conflicts and complex decisions, particularly as the complexity of the circuit board increases or the installer's experience decreases. Various choices must be made for selecting interrupt lines, DMA channels and address locations which do not conflict with those of another circuit board. After the choices have been made, often based on reading highly cryptic or obscure manuals, the actual configuration must be done. In previous circuit boards, setting the interrupt, DMA and address options generally entailed setting the correct switches or jumpers, again as indicated by the manual. Initialization of software activated options had to be included in special initialization procedures or set at the beginning of the desired applications package.

As a result, configuration was very complex and time consuming, particularly for relatively unskilled users or for experienced systems integrators when using new circuit boards.

SUMMARY OF THE INVENTION

This invention provides a method for configuring a computer system and circuit boards to access common computer system resources such as interrupt lines, DMA channels and addresses when the computer system provides for the circuit boards to be interchangeably inserted into a plurality of system slot locations. This invention determines the available configuration options and their associated settings of the circuit boards installed or to be installed in the system, with each configuration option and associated setting being specified in terms of one or more parameters. This invention additionally may determine board initialization parameters and the slot location in which a board is inserted or is to be inserted.

When more than one configuration option and setting is specified for a circuit board, each option being defined by a set of parameters, this invention selects one option from the plurality of choices so that the system can configure the boards to operate without conflicts of the common resources. In all likelihood, the user's first request will be to configure the system with all boards enabled. If such is impossible, the user may then choose to delete or disable certain boards. In fact, if the user's system cannot configure with all boards enabled, the user may adopt several alternate configuration patterns based upon different user specifications that are a function of the user's need for the system functionality at the time.

Certain configuration information based upon the selected options is stored for use in running the computer system. This information may be stored in the computer system's own non-volatile memory, such as battery-powered CMOS random access memory, and/or in a diskette file.

This invention includes at least three methods for determining what are the configuration options and associated settings for access to common computer system resources of the circuit boards. The invention includes the establishment of a configuration file format for indicating the circuit board option and setting parameters. This format accommodates parameters for access to common computer system resources and for a circuit board's initialization requirements. This configuration file format is made available to board manufacturers, who preferably would provide with their circuit board's configuration file according to this established format which includes the appropriate configuration and initialization options and settings. Manufacturers supplying a configuration file with a circuit board would ease system configuration problems for the user.

Additionally, the computer system manufacturer will establish a database or collection of configuration information or configuration files for selected circuit boards. This collection of configuration files is supplied to the user with a configuration program so that a user can look up the particular boards to be configured in the user's system and extract the needed configuration file information if the manufacturer does not supply a configuration file or the file is not available.

In the case of circuit boards for which the manufacturer does not supply a configuration file or the file is not available and for which there is no configuration information in the system manufacturer's supplied collection, this invention provides a utility for creating a configuration file containing the parameters comprising the one or more options and settings of the board to access common computer system resources and/or board initialization values. To aid the user in creating the configuration file, the system provides an initial template of a configuration file in which all parameters that have default values (and a default value is established for all circuit board parameters that have a finite number of options) are already filled in with the default value in place. The user in creating the configuration file may simply augment and/or modify the template supplied until all the options, settings and initialization parameters are incorporated.

BRIEF DESCRIPTION OF THE DRAWINGS

FIGS. 1, 1A, 2, 3A, 3B, 4 and 6 are flowchart illustrations of portions of the operating sequences and menus of a method and apparatus according to the present invention.

FIGS. 7A, 7B, 7C, 7D, 7E, 7F, 7G, 7H, 7I are representations of board orientation and switch and jumper orientations and orders.

DESCRIPTION OF THE PREFERRED EMBODIMENT

Figure 1:
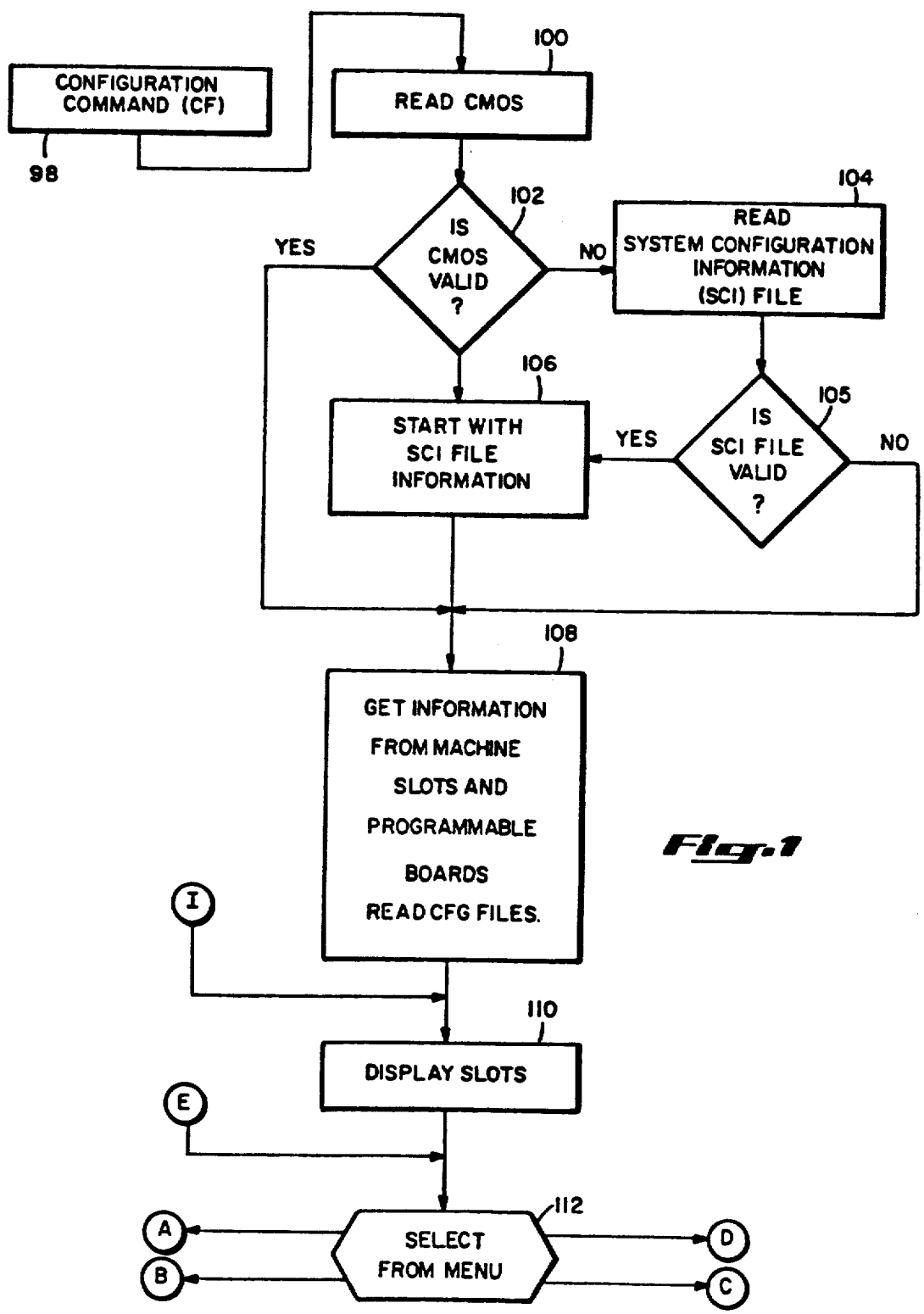

The following disclosures are hereby incorporated by reference:

U.S. application Ser. No. 243,327, entitled "Multiple Word Size Computer Interface with Master Capabilities" by Paul R. Culley, filed on Sep. 9, 1988 now U.S. Pat. No. 5,109,332;

U.S. application Ser. No. 243,480, entitled "Computer System With High Speed Data Transfer Capabilities" by Paul R. Culley, filed on Sep. 9, 1988 now U.S. Pat. No. 4,058,005;

U.S. application Ser. No. 242,728, entitled "Extended Input/Output Circuit Board Addressing System" by Paul R. Culley and Montgomery McGraw, filed on Sep. 9. 1988 now U.S. Pat. No. 4,999,805; and U.S. application Ser. No. 242,954, entitled "Programmable Interrupt Controller" by Paul R. Culley, Montgomery McGraw, Karl N. Walker and Lazaro D. Perez, filed on Sep. 9, 1988 now abandoned, all of which are assigned to the assignee of this invention.

The present invention provides the means for automatically determining, and optionally setting, the configuration of circuit boards utilizing common computer system resources such as interrupt lines, DMA channels and addresses. Determination of board configuration information is central to the efficient operation of the preferred embodiment. With this invention, circuit board manufacturers can include configuration files with their circuit board products to speed the product and system configuration process. These configuration files can be included with new fully programmable circuit boards or with conventional switch or jumper configured circuit board products. It is concluded that these manufacturer-supplied, machine readable configuration files will become a requirement with fully programmable circuit boards to allow efficient use of set up time and optimal use of circuit board capabilities.

Alternatively, the configuration information can be contained in and accessible from a database or collection of configuration information or configuration files supplied by a computer system manufacturer or the information can be developed interactively with the user and stored in a new configuration file.

However derived, the configuration information is used at system configuration time by the preferred embodiment, in a manner described below, to resolve any conflicts in the assignment of common computer system resources such as interrupt lines and DMA channels. These files are also used in the preferred embodiment to develop and store the information necessary for system board and circuit board initialization. The information contained in the configuration file of the preferred embodiment, its format and its usefulness will be described first. Having described a configuration file, the method and means for determining the file, configuring the system and storing the configuration information of the preferred embodiment will be described.

The information in the configuration file consists of a series of parameters which serve two general purposes: common computer system resource allocation and circuit board initialization. Several parameters may specify common computer system resources used by a circuit board. These parameters may further specify various options for access to system resources that the board may use. For example, a file may contain the different number and type of interrupts that a board is capable of using. As described below, these parameters are used by the preferred embodiment of the present invention during the automatic computer system configuration process to ensure that the common computer system resources, such as memory address ranges, I/O address ranges, interrupt levels, and DMA channels used by a circuit board do not conflict with those other computer system devices.

The second type of parameter concerns local circuit board specific operation alternatives; these parameters do not deal with common system resources. They determine how the board can be configured upon system initialization. For example, these parameters might include the baud rate, word length and parity selection for an asynchronous serial communications device. These parameters allow selection, at system configuration time, of the board operation alternatives which will be selected during initialization. The selected alternatives are then used to derive the information that the computer system initialization sequence uses to initialize the circuit board. For example, using these parameters, a memory board may be configured with portions of its memory partitioned among the conventional, extended and expanded memory areas available in products utilizing the operating system generally referred to as MS-DOS developed by Microsoft Corporation. When used in a computer system having this capability, an expansion memory board can easily support any operating system without dealing with the limitations of each operating system.

In the preferred embodiment, a product identifier is preferred for circuit boards that are interchangeably insertable in a plurality of slot locations in the computer system and which boards utilize an addressing method that depends on their slot location. The identifer assists in determining the slot in which a board has been installed. Once located, the board can be programmed with the configuration parameters specified in the configuration file and chosen by the user at system configuration time.

Specifically, according to the preferred embodiment of the present invention, the common computer system resource parameters in a configuration file include memory address ranges, I/O address ranges, interrupt line assignment and triggering, and DMA channels.

Memory address range parameters specify both the optional and required memory ranges utilized by a board. General characteristics of the memory ranges, such as cacheability or read-only capability, are also included for each range. For boards that require I/O addressing, the choices of input/output ranges that the board can use are specified in the parameters. Parameters are provided to specify the number of interrupts required as well as the specific interrupt choices supported by a board. A board capable of supporting shareable, level-triggered interrupts can have that option specified as one of the interrupt choices. Parameters can also specify the number of DMA channels as well as the specific DMA channel choices supported by a board.

According to the preferred embodiment of the present invention, in addition to common computer system resource parameters, the configuration file can specify a number of board-specific operational parameters. Each parameter can include a number of alternative selection values from which a user can choose a desired board operation. A default value which can be provided for each parameter should reflect the most typical and frequent use of the product. Each specific operational parameter should specify the I/O address, bit pattern and value that must be used to initialize each of the alternative selections.

The preferred embodiment of the present invention utilizes the following overall configuration file format:
Board Identification Block;
Initialization Information Block(s); and
Function Statement Block(s).

The Board Identification Block contains the identifier of the board and must be the first block. The Initialization Information Blocks contain the information about the port, switch or jumper setting or initialization values and locations used to configure the board. The Function Statement Blocks contain a description of the board's functions and the common system resources that must be and can be used by the board.

The following is an example of a Board Identification Block:

```
ID = "7 character ID"
NAME = "description"
MFR = "manufacturer"
CATEGORY = "Board category"
[SLOT = ISA8 | ISA16 | ISA8OR16 | EISA | EMB(n) | VIR]
[LENGTH = value]
[SKIRT = YES|NO]
[READID = YES|NO]
[LANGUAGE = EN | FR | GR | IT | SP]
[CODE = "filename.OVL"]
[COMMENTS = "information"]
[HELP = "information"]
``` where the information within quotation marks is free form text and the information within square brackets is optional. Items which are separated by a "|" indicate that only one choice of those indicated is allowed. A space separating items indicates that all the items are included.

The required ID field contains a seven character product identifier, or ID. This ID is used to uniquely identify the board and to name the configuration (CFG) file. In the preferred embodiment, the ID consists of a three-letter code derived from the manufacturer's name, a two-character hexadecimal product identifier, and a two character hexadecimal revision number.

NAME is a required field containing text identifying the product. Manufacturer and product name should be included. Revision and part numbers may also be included.

MFR is a required field containing text identifying the board's manufacturer.

CATEGORY is a required field containing a coded board category. The category is a three letter code, preferably chosen from the following list.
COM Communications Board
MEM Memory Expansion Board
MFC Multi-function Board
MSD Mass Storage Device
NET Network Board
NPX Numeric Coprocessor Board
PAR Parallel Port Board
PTR Pointing Device
SYS System Board
VID Video Adapter Board
OTH Other The optional SLOT field contains a list of slot sizes and types that the board can use such as: 8, 16, or 32 bit, conventional or extended architecture. The default is ISA16. A slot value of EMB(n) indicates an embedded slot, used when a resource resides on another board, typically the system board. Embedded slots are slot specific as later defined and are slots that are not physically available on the system board. A SLOT=EMB(o) indicates that this file is the system board configuration file, which has a special meaning as will be explained later. A slot value of VIR indicates a virtual slot, which allows peripherals to be added to installed boards such as disk controllers and allows functions or devices which reside on the system board to appear separately. Virtual slots may also contain resource information for software drivers, such as extended memory managers, that require resources. Virtual slots preferably cannot use slot specific addressing and do not have readable ID's.

The optional LENGTH field specifies the board length in whole millimeters. The optional SKIRT field indicates whether the board has a lower extension or skirt which prevents its installation in certain slots. The default value is NO. The READID field is an optional field with a default of NO to indicate if the board has a readable identification value.

The LANGUAGE field is optional and indicates the language of the CFG file. The default is English, with preferably allowed values of EN, FR, GR, IT, SP for English, French, German, Italian and Spanish, respectively.

The CODE field is an advanced feature and allows for inclusion of vendor or manufacturer specific program segments. This may be useful if the integrator or user must enter passwords to allow operation of the system. Other useful cases include when any configuration information needed for the board is not located in the standard locations provided by the system board and when specific code must be used to determine the presence of particular hardware. Each vendor specific program segment has five executable modules contained into a single file which is referenced by the filename.OVL parameter value. Preferably the filename is the board ID, so that the configuration file and the vendor specific file have similiar filenames.

The first module in the vendor specific program is the table program which provides a table of starting addresses for the remaining modules and data block pointers to the configuration means. The second module is the initialization module. The initialization module is executed before the configuration means tries to configure the system. The initialization module does any necessary checking of system hardware, obtains any information necessary from the integrator and builds a small, simple configuration file fragment to return to the configuration means so that the configuration means can know the available functions and needed resources of the board. The configuration file fragment may contain Initialization Identification and Function statement blocks but does not contain a Board Identification Bock, that being previously supplied in the main configuration file. The configuration file fragment is text forming the missing portions of the main configuration file of the board.

The third module is the change module and is used when the integrator wishes to change a function or a choice, generally only used to resolve an otherwise unresolvable conflict. Information is saved on what changes are made to allow the changes to be undone if desired. The changed information is also provided to the remaining portions of the configuration means as necessary.

The fourth module is the update module which allows the configuration information to be saved. The information is either placed in the appropriate memory directly or stored in the system definition information data segment maintained by the main portions of the configuration means.

The fifth and final module is the undo module which allows the integrator to undo the change just made or to return to the default values provided.

This vendor specific file handling and interface defines a simple manner for allowing a vendor or manufacturer to develop hardware which requires specific programs for their interpretation and yet allows the system to do a proper resource configuration to prevent conflicts.

The optional COMMENTS field contains information that will be displayed when the board is selected. The comments must be enclosed in quotation marks and can contain encoded embedded tabs and linefeeds. The COMMENTS field has this meaning for all statements.

The optional HELP field contains textual information that will be displayed should the user request help during system configuration. The HELP field has this meaning for all statements.

As previously mentioned, the system board configuration file is slightly different because it contains an extra identification block, the System Board Identification Block. The additional block is necessary because additional information must be obtained on the system board itself. The System Board Identification Block is placed after the Board Identification Block and has the following general syntax:

```
SYSTEM
    EISACMOS = value
    SLOT(1) = ISA8 | ISA16 | EISA
        LENGTH = value
        [SKIRT = YES | NO]
    .
    .
    SLOT(n) = ISA8 | ISA16 | EISA
        LENGTH = value
        [SKIRT = YES | NO]
```

The required EISACMOS field has a parameter indicating the amount of nonvolatile, preferably battery powered CMOS, memory available for slot specific uses. The SLOT(i) statement identifies the particular slot number and the type of slot, that is, whether it can receive a conventional architecture 8 or 16 bit board or can receive an extended architecture board. The associated required LENGTH statement specifies, in millimeters, the longest board that can be held in that slot. The associated, optional SKIRT statement indicates whether a board having a lower extension or skirt can be installed, with a default of YES. The SLOT statement and associated LENGTH and SKIRT statements are repeated until all the slots present on the system board have been identified.

The following portion of a CFG file illustrates how the Board Identification Block of an ACME Manufacturer multifunction circuit board containing one printer and one serial port would appear.

ID = "ACM0117"
NAME = "MULTIFUNCTION BOARD"
MFR = "ACME MANUFACTURER"
SLOT = ISA8
SKIRT = YES
CATEGORY = "MFC"
COMMENTS = "The ACME multifunction board supplies serial and parallel port functions."

Information Initialization Blocks can consist of four types of statements, those associated with programmable I/O address locations, those for switches, those for Jumpers and those for software. The Information Initialization Block for programmable boards contains the IOPORT(i) statement, which includes the I/O address locations used, how they are addressed, and what the initial value might be. The following figure shows the general syntax of an IOPORT(i) statement. IOPORT(i) = address or PORTVAR(i)

```
IOPORT(i) = address or PORTVAR(i)
    [SIZE = BYTE | WORD | DWORD]
    [INITVAL = value]
```

The IOPORT(i) statement indicates which address location is to be used, the i being an index identifying the IOPORT statement, not a specific system slot. These I/O address locations can be listed as slot specific locations, where a 0Z prefix indicates a slot specific location, or can be non-specific locations. The same address can be used in several IOPORT(i) statements, allowing a sequence of values to be written to the same address.

As an advanced feature, the address can be supplied indirectly by using the PORTVAR(j) argument, where j is an index to identify the PORTVAR reference. The address is later assigned to the PORTVAR(j) reference in a CHOICE statement, which will be defined, where the following general syntax is used:

PORTVAR(j) = address

This feature allows added flexibility when various choices such as serial ports or printer ports are being configured.

The optional SIZE field gives the width of data associated with the address location, either 8, 16 or 32 bits, and has a default of BYTE. The optional INITVAL field contains the binary bit mask for the location. The bit mask can have four different values at a given bit location. Values of 0 or 1 indicate that the bit must be set at that value. A value of an r indicates that the bit value will first be read from the I/O port and then the read value written back. A value of an x or X indicates that the bit will be set by the configuration program. If a bit value is omitted, the value written will be what was read, unless it is to be set by the configuration program.

The Initialization Information Block for switch programmable boards contains the SWITCH(i) statement. The following figure shows the general syntax of an SWITCH(i) statement:

```
SWITCH(i) = n
    NAME = "switch name or description"
    STYPE = DIP | ROTARY | SLIDE
    [VERTICAL = YES | NO]
    [REVERSE = YES | NO]
    [LABEL = LOC(switchlist) textlist]
    [INITVAL = LOC(switchlist) valuelist]
    [FACTORY = LOC(switchlist)valuelist]
    [COMMENTS = "configuration comments"]
    [HELP = "information"]
```

The SWITCH(i) statement indicates the number of switches in the set or switch positions in the switch, with the i being an index identifying the particular SWITCH statement. The required NAME field is the manufacturer's name for this control block. The required STYPE field indicates whether the switch is a DIP switch, a set of switches having two positions, ON and OFF; a ROTARY switch, having a number positions arranged in a circle; or a SLIDE switch, having a series of positions in a straight line. The VERTICAL field is optional and indicates the orientation of the switch and has a default of NO (FIGS. 7B to 7E). The optional REVERSE field indicates the orientation of the switch, that is reversed, such as 1234, or normal, such as 4321.

The optional LABEL field explains the labels used on the board by the manufacturer to label the switches. The switchlist parameter is the list of switches being referenced and is either a series of numbers representing switches in ascending or descending order separated by spaces or a range of numbers specified by two numbers separated by a hyphen. The textlist parameter is a series of text strings in quotation marks and separated by spaces, with the number of strings in the series equalling the number of switches specified by the switchlist parameter.

The optional INITVAL field is used to specify the value of reserved switches in a set. The valuelist parameter is a bit string with a value of 1 or 0 for each bit as appropriate, with the numbers of bits equalling the number of switches specified by the switchlist parameter of the INITVAL field. If the field is omitted the switches are assumed to be set by the configuration program or the position of the switch doe not matter.

The optional FACTORY field is a mask of the default settings for the switches. The use of the INITVAL and FACTORY fields are particularly important for switches that control a undocumented option, but are required to be in a specific state.

The Jumper Identification Block general syntax is as follows:

```
JUMPER(i) = n
    NAME = "jumper name or description"
    JTYPE = INLINE | PAIRED | TRIPOLE
    [VERTICAL = YES | NO]
    [REVERSE = YES | NO]
    [LABEL = LOC(jumperlist) textlist]
    [INITVAL = LOC(jumperlist) valuelist]
    [FACTORY = LOC(jumperlist) valuelist]
    [COMMENTS = "information"]
    [HELP = "information"]
```

Figure 7A:
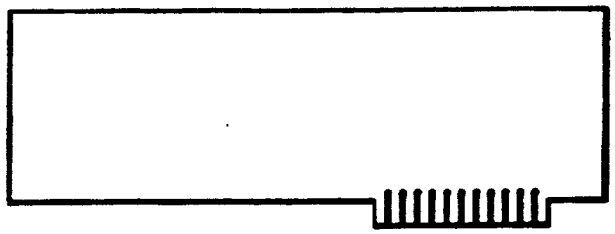
Figure 7C:
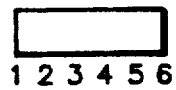
Figure 7E:
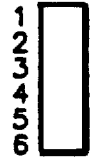
Figure 7H:
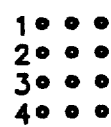

The JUMPER(i) statement defines the number of jumper positions in the set, with the i being an index identifying the particular JUMPER statement. The NAME, COMMENTS and HELP fields are similar to their so named counterparts in the Switch Identification Block. The required JTYPE field defines the type of jumper being referenced. INLINE jumpers (FIG. 7I) are arranged in a single line to be connected from one post to the next post. PAIRED jumpers (FIG. 7F) are arranged as a series of double posts, with connections made across the posts. TRIPOLE jumpers (FIGS. 7G, 7H) are arranged as a series of triple posts, with each jumper having two possible settings. The VERTICAL and REVERSE fields are equivalent to the like named switch fields.

The LABEL field in the Jumper Identification Block is equivalent to the LABEL field in the Switch Identification Block, with the jumperlist parameter listing the jumpers being referred to. Paired and tripole jumpers are defined by a number, with the jumperlist being similar to the switchlist. Inline jumpers are defined differently with numbers identifying the individual posts and two numbers separated by a caret identifying a jumper position, with ranges not allowed.

The INITIAL and FACTORY fields have functions similar to the same fields in the Switch Identification Block, but the states are defined somewhat differently. For a paired jumper or an inline jumper, a 1 indicates that the jumper is present, while a 0 indicates it is not present. In a tripole jumper a 1 indicates the jumper is in the upper position for horizontal jumpers or the right position for vertical jumpers, a 0 indicates the jumper is in the lower position or left position and an N indicates the jumper is not present. For all jumpers an X indicates a don't care state.

The fourth type of identification block is the Software Identification Block with the following general syntax:

SOFTWARE(i)="software description"

The i is used in the SOFTWARE statement to distinguish the various SOFTWARE statements in the Initialization Information Block. When the computer system is being configured the text forming the software description is displayed to the user as directed by the INIT statement, which is defined later. The SOFTWARE statement allows the manufacturer to indicate to the user that certain device drivers, resident programs, setup programs or other programs or codes must be included in the CONFIG.SYS file, in the AUTOEXEC.BAT file or as switches for programs which must be run.

COMMENT and HELP statements may be included with the IOPORT and SOFTWARE statements, but have not been used in the preferred embodiment because no integrator action is needed based on those statements and the file structure is simpler without them.

As a specific example of an Initialization Information Block, please see the following:

```
;INITIALIZATION INFORMATION BLOCK
IOPORT(1) = 0ZC81h
    SIZE = BYTE
    INITVAL = rr10xxxx
SWITCH(1) = 8
    NAME = "SWITCH BLOCK 1"
    STYPE = DIP
    REVERSE = YES
    INITVAL = LOC (2 3) 1 1
    FACTORY = LOC (1-8) 01101111
JUMPER(1) = 7
    NAME = "JUMPER BLOCK 1"
    JTYPE = INLINE
    REVERSE = YES
```

```
LABEL = LOC (1∧2 3∧4 5∧6 7∧8) "SW1" "SW2"
        "SW3" "SW4"
FACTORY = LOC (1∧2 3∧4 5∧6 7∧8) 0110
```

The Function Statement Block includes the description of the function or functions that the board performs, along with the common system resources required by the function. Because several functions can be integrated onto a single board, the CFG file can include several FUNCTION statement blocks. A different FUNCTION statement would be used for different functional areas on a single board, such as printer control, serial control, or video control. Within each function block, different choices about the resources may be available. These choices include descriptions of the resources required if that choice is selected. These choices allow a way for the configuration program to eliminate conflicts. Below is an example of the framework or syntax of a function block.

```
FUNCTION = "name"
    [TYPE = "function type"]
    [CONNECTION = "location"]
    [COMMENTS = "information"]
    [HELP = "information"]
    CHOICE = "name"
        Resource Description Block
    [CHOICE = "name"]
        [Resource Description Block]
    [SUBFUNCTION = "name"]
        [TYPE = "function type"]
        [COMMENTS = "information"]
        [HELP = "information"]
        [CHOICE = "name"]
            [Resource Description Block]
    [SUBFUNCTION = "name"]
        [TYPE = "function type"]
        [COMMENTS = "information"]
        [HELP = "information"]
        [CHOICE = "name"]
            [Resource Description Block]
```

The FUNCTION statement itself includes text about the nature of the board and information about the resources that the board requires. If the board requires several FUNCTION statements, each one describes the subset of the board functionality it is configuring.

The optional TYPE statement is used to identify a function or device on the board. The function type is a text string, preferably upper case. The function type may be transferred to the computer system's CMOS RAM for later interrogation by a program, particularly where the information can be used by a specific application program to tailor its operation. To help develop uniformity certain function types can be defined, with preferred definitions in the following list. The more generic function is listed first, with a more detailed function present following a comma delimiter.

| Device Type | Device Description |
|---|---|
| COM,ASY | Standard ISA compatible serial controller |
| COM,ASY,FIFO | NS16550A based serial ctrl. with FIFO |
| COM,SYN | Synchronous communications controller |
| COM,ASY,SYN,SDLC, BSC,HDLC | Multi-function communications card supporting async, SDLC, bisync, and HDLC protocols |
| PAR | ISA compatible parallel port controller |
| PAR,BID | ISA parallel port with bidirectional mode |
| PTR,8042 | Standard 8042 pointing device |
| NPX,287 | Intel 287 numeric coprocessor |
| NPX,387 | Intel 387 numeric coprocessor |
| NPX,387SX | Intel 387 numeric coprocessor, SX version |
| NPX,W1167 | Weitek 1167 numeric coprocessor |
| NPX,W3167 | Weitek 3167 numeric coprocessor |
| KEY,nnn,COU=xx | Standard keyboard nnn = number of keys (083,084,101, or 103) xx = keyboard country code (US,UK,FR,GR,IT,SP, LA,SV,SU,NL,DK,NO,PO, SF,SG,CF, or BE) |
| VID,MDA | Standard mono adapter |
| VID,MDA,HERC | Standard Hercules mono adapter |
| VID,CGA | Standard CGA adapter |
| VID,CGA,ATT400 | CGA with AT&T 640x400 superset |
| VID,EGA | Standard EGA adapter |
| VID,VGA | Standard VGA adapter |
| MSD,DSKCTL(1) | Primary standard AT-compatible disk ctl. |
| MSD,FPYCTL(1) | Primary standard 765 floppy controller |
| MSD,TAPCTL(1) | Primary tape controller |
| OTH,JOY | Miscellaneous entry (OTHer) identifying a joystick card |

The CONNECTION statement is an optional statement which allows the location of the connector for that particular function to be shown to the integrator. The location is the text parameter supplied the text parameter supplied and is preferably a short string.

The optional COMMENTS field contains information that appears when the function is selected. COMMENTS after a specific function appear only when the associated function is selected.

The CHOICE statements place resource values into logical groups. At least one CHOICE statement is required. Subsequent CHOICE statements are optional. The name field describes the choice and appears when the choice is selected. For example, if the function were a serial port, the choices might be "COM1", "COM2", and "Disable Port." Each choice can require a different set of common system resources and a different initialization value. In the preferred embodiment the most desired choice is placed first, with the remaining choices being included in preferred priority order. The configuration means uses the first nonconflicting CHOICE it encounters.

The SUBFUNCTION statement is considered an advanced feature and can be used if a given function has several configurable pieces. The genera syntax for a SUBFUNCTION statement is the same as the syntax for a FUNCTION statement, with the exception that further subfunctions cannot be included. It is noted that the FUNCTION statement can have its own TYPE, COMMENTS and HELP statements, and CHOICEs in addition to those present in the SUBFUNCTION statements. An example using various advanced features is shown later.

Resource Description Blocks appear as part of a CHOICE statement. The Resource Description Block listed within a CHOICE statement contains the resources associated with that CHOICE. Depending on the board being described, the Resource Description Blocks could include the following types of resources: DMA channel requests and programming; interrupt channel requests and programming; I/O address definitions; memory size and configuration; and initialization values and switch and Jumper settings.

The general syntax for a Resource Description Block is as follows:

```
[SUBTYPE = "choice type"]
[DISABLE = YES | NO]
[HELP = "information"]
[Resource Statements]
[INIT statements]
```

The optional SUBTYPE field is used in conjunction with the TYPE statement to provide yet more information regarding the particular function being performed by the board. The text in the SUBTYPE field can be appended to the text in the TYPE statement for reference by other programs. For example, if the TYPE statement is TYPE="COM,ASY", the SUBTYPE fields in different Resource Description Blocks could be SUBTYPE="COM1" and SUBTYPE="COM2" to indicate the serial channel to which that particular board was configured.

The DISABLE statement indicates if that CHOICE disables the function. This statement allows the configuration means to identify this as the least desirable choice and use this choice only if an otherwise unresolvable resource conflict develops. The default value is preferably NO.

The Resource Statements list the system resources that will be used if that CHOICE is selected. These statements identify the particular DMA channel, interrupt line, I/O port and memory address resource values to be used in the configuration process. The INIT statements are generally related to the Resource Statements and provide the actual values to be used with programmable boards and the settings for nonprogrammable boards for the associated Resource Statement. Grouping or the relationship between the Resource Statements and the INIT statements is discussed later.

There are four currently defined types of Resource Statements, based on the need to allocate DMA channels, I/O ports, interrupt lines and memory address space. If more allocatable resources are contained on the computer system, appropriate Resource Statements can be developed. The four currently defined Resource Statements are the DMA statement, the PORT statement, the IRQ statement and the MEMORY statement. Below is illustrated a DMA statement in general terms.

```
DMA = list
    [SHARE = YES | NO]
    SIZE = BYTE | WORD | DWORD]
    [TIMING = DEFAULT | TYPEA | TYPEB | TYPEC]
```

The requested DMA channels appear in the list. The optional SHARE field indicates whether the function is willing to share this DMA channel and has a default of NO. The SHARE field could be YES if, for example, the floppy controller and tape drive used the same channel. The optional SIZE field indicates the width of the data transferred by the DMA channel. The computer system being configured preferably supports several different DMA timings. The optional TIMING field specifies which of these different timings is used by the DMA channel.

For a specific example, assume the ACME Manufacturing tape controller board can use DMA channel 3 or 5 and it can share the chosen channel. The ACME tape controller uses 16-bit DMA transfers, and can support TYPEB timing.

The following portion of a CFG file shows the values for the ACME board.

```
DMA = 3 | 5
    SHARE = YES
    SIZE = WORD
    TIMING = TYPEB
```

Below is shown the general format of the PORT statement.

```
PORT = rangelist [STEP = value] [COUNT = value]
    [SHARE = YES | NO]
    [SIZE = BYTE | WORD | DWORD]
```

The rangelist identifies the address of the port and can be a single value or a range of values. If a range is used, a STEP field may be supplied. The STEP field indicates the number of ports desired and the increment which is to be used in searching for available port space. If the number of ports desired is different than the increment size, the COUNT field may be added to indicate the number of ports, the STEP field then indicating the searching step size. A STEP field is necessary before a COUNT field is used and if neither is used, all ports in the range are requested. The SHARE and SIZE fields have the same meaning as in the DMA statement.

For specific examples, assume the board utilizes an addressing technique wherein the I/O space address location is at least partially dependent on the installed slot location as used by the central processor to increase the amount of non-conflicting I/O space available, with the addresses being represented by 0ZXXh, the Z representing the hexadecimal digit indicating the number of the slot containing the board, this technique being referred to herein as slot specific addressing.

PORT=0Z00-0Z0Fh

This example indicates that the entire range of 16 ports from 0Z00n to 0Z0Fh will be used.

PORT=0Z00h-0Z0Fh STEP=4

This example indicates that four ports are to be used, in any of the following ranges: 0Z00h-0Z03h, 0Z04h-0Z07h, 0Z08h-0Z0Bh, 0Z0Ch-0Z0Fh.

PORT=0Z00h-0Z0Fh STEP=4 COUNT=2

This example indicates that two ports are desired but the step size must be four with the following ports available for use: 0Z00h-0Z01h, 0Z04h-0Z05h, 0Z08h-0Z09h, 0Z0Ch-0Z0Dh.

Below is shown the general format of the IRQ Statement.

```
IRQ = list
    [SHARE = YES | NO]
```

```
[TRIGGER = LEVEL | EDGE]
```

The requested interrupts appear in the list. The optional SHARE field indicates whether the function is willing to share this interrupt. The default is NO. The optional TRIGGER field specifies whether the interrupt is level or edge triggered, with the default being EDGE.

For a specific example, assume the ACME Manufacturing tape controller needs two interrupts. It can use interrupts 11 and 12 or 14 and 15, but it can not share the assigned interrupts. The ACME tape controller needs the chosen interrupts to be edge triggered.

```
IRQ = 11 12 | 14 15
SHARE = NO
TRIGGER = EDGE
```

Below is shown the general format of the MEMORY Statement, which defines the amount, location and other characteristics of a memory board.

```
MEMORY = rangelist [STEP = value]
[ADDRESS = rangelist [STEP = value]]
    [WRITABLE = YES | NO]
    [MEMTYPE = SYS | EXP | OTHER]
    [SIZE = BYTE | WORD | DWORD]
    [CACHE = YES | NO]
    [SHARE = YES | NO]
```

The MEMORY Statement is used to define the range of memory on a board. Generally memory boards allow various amounts of memory to be installed on the board. Thus the rangelist can be a series of values or a range as indicated by two values separated by a hyphen. If a range is specified, a STEP field can be used to indicate the smallest increment by which memory can be added to the board.

The ADDRESS field specifies the address of the memory. If a single address is given, the memory must be located there. A rangelist can be a list of addresses at which the memory can be located or can be a range indicating that the memory can start at the first available location in the range as long as the memory can be entirely contained in that range. If a range is specified, the STEP statement provides the granularity of the memory, that is, the value used to change the attempted memory start location. The WRITABLE field indicates whether the memory is random access (RAM) (YES) or read only (ROM) (NO), with a default of YES. The MEMTYPE field specifies whether the memory is SYStem (memory located in the physical address space of the microprocessor), EXPanded (memory available to be used by expanded memory managers operating, for example, according to the EMS 3.2 or 4.0 specifications), or OTHER (memory not managed by the operating system, such as expanded memory page frames, memory mapped I/O and bank-switched memory).

The SIZE field indicates the data width of the board. The CACHE field indicates whether this memory can be cached. The memory on a graphics board, for example, would not be cached. The default for the CACHE field is NO. The SHARE field indicates whether the memory address space can be shared and has a default of NO.

Two simple examples of MEMORY statements follow.

```
MEMORY = 128K
ADDRESS = 0E000h
    WRITABLE = NO
    MEMTYPE = SYS
```

This example describes a 128K ROM located only at address 0E000h.

```
MEMORY = 1M-4M STEP = 512K
ADDRESS = 1M-16M STEP = 256K
    WRITABLE = YES
    MEMTYPE = SYS
```

The example describes a memory expansion board that can contain from 1 to 4 Mbytes of extended RAM. The memory can be added in 512 kbyte increments, with the address of the memory lying between 1 Mbyte and 16 Mbyte, with the starting address being any 256 kbyte boundary within this range.

For a more complex example, assume ACME Manufacturing has a network board that contains onboard memory. The network board contains 64 kbytes of RAM. The board needs this memory to begin in the 1-2 Mbyte range. This memory will be writable, because it is RAM; but it would not be cacheable, because it is assumed to be the board's local memory. There are also two 2 kbyte ROM's on the board, each of which can be accessed at 0C0000h, 0D0000h or 0E0000h. The ROM's would not be writable but would be cacheable. The following example shows the portion of the CFG file that describes the memory, beginning with the RAM, followed by the ROM's. There are three MEMORY statements to describe the ACME Manufacturing network board memory.

```
;NETWORK BOARD RAM
MEMORY = 64K
ADDRESS = 1M-2M STEP = 64K
    WRITABLE = YES
    SIZE = BYTE
    MEMTYPE = SYS
    CACHE = NO
;NETWORK BOARD ROM1
MEMORY = 2K
ADDRESS = 0C0000h | 0D0000h | 0E0000h
    WRITABLE = NO
    MEMTYPE = SYS
    SIZE = BYTE
    CACHE = YES
;NETWORK BOARD ROM2
MEMORY = 2K
ADDRESS = 0C0000h | 0D0000h | 0E0000h
    WRITABLE = NO
    MEMTYPE = SYS
    SIZE = BYTE
    CACHE = YES
```

The lines beginning with semicolons are comment lines and can be inserted for easier interpretation of the configuration information.

As the FUNCTION statement has the SUBFUNCTION statement, the CHOICE statement also has the SUBCHOICE statement. The general syntax follows.

```
CHOICE = "name"
    global Resource Description Block
```

-continued

```
[SUBCHOICE]
    [subchoice Resource Description Block]
[SUBCHOICE]
    [subchoice Resource Description Block]
```

A CHOICE statement may have as many subchoices as desired, but only one SUBCHOICE statement per CHOICE statement is utilized. Each SUBCHOICE statement contains the Resource and INIT statements relating to the SUBCHOICE, while the global Resource Description Block contains the Resource and INIT statements which are used regardless of the SUBCHOICE used. Subchoices are used to allow the configuration means to select from the available choices, rather than have the integrator select from a long, often confusing, list of configuration choices as, for example, in a memory expansion board having capabilities of performing in conventional, extended or expanded modes. For further example, if the integrator did not wish to make a choice between the actual locations of a serial port, such as COM1 or COM2, a CHOICE statement would be developed for the serial port and SUBCHOICE statements for COM1 and COM2 would be used. However the integrator would not know which COM port had been selected so that in this case the use of subchoices is not recommended.

A better example is use with a memory board. Assume that a memory board is being configured and the allocation of memory on the board between base system memory and extended memory is dependent on the amount of memory that currently exists in the system. This could be accomplished by four CHOICE statements as follows:

```
CHOICE = "Memory located after 256K"
CHOICE = "Memory located after 384K"
CHOICE = "Memory located after 512K"
CHOICE = "Memory located after 640K"
``` or a single CHOICE statement as follows and four SUBCHOICE statements:

CHOICE="Memory located after existing base memory" If the system already had 512 Kbytes of base memory installed, the configuration means would automatically select the third SUBCHOICE in the subchoice example but would have an unresolvable conflict in the CHOICE only case until the first two CHOICES were disabled, generally manually by the integrator. Thus the use of SUBCHOICES simplifies operation for the integrator.

For particular use with the SUBCHOICE statements in memory board CHOICE statements is the TOTALMEM statement whose general syntax is as follows:

TOTALMEM = rangelist [STEP = value]

The TOTALMEM statement is used to identify the total memory located on the board, particularly valuable when the memory can be allocated between conventional, extended or expanded types. This allows the configuration means to verify that the total amount of memory selected does not exceed the maximum installed. The TOTALMEM statement must be used with any CHOICE statement that allows the memory to be divided between conventional, extended and expanded, preferably placed before any Resource or INIT statements. The memory amount referenced includes only SYS and EXP memory types but not OTHER memory.

INIT statements provide the values needed to initialize programmable boards or the jumper or switch settings used on non-programmable boards. The INIT statements for programmable boards concern I/O addresses and the values that should be written to those locations to set up a given configuration choice. The example below shows the first general format of the INIT statement for I/O addresses which would be used for programmable boards.

INIT = IOPORT(i) list

The IOPORT(i) field refers to the I/O address or port previously defined in the Initialization Information Block. The INIT statement contains the list of values to be written to that I/O address or port. The values are in a binary form with a bit mask. For example, assume the following INIT and DMA statements are related, and that bit 3 of the port defined by the IOPORT(i) statement in the Initialization Information Block must be set to enable DMA channel 3 and cleared to enable DMA channel 4:

```
LINK
    DMA = 3 | 4
    INIT = IOPORT(1) xxxx1xxx | xxxx0xxx
```

The x's refer generally to bits which are not changed from their existing condition.

A second general format is provided for boards which must have a large number of IOPORT statements and the associated INIT statement linkage would get cumbersome. A direct addressing form is provided so that a corresponding IOPORT statement is not needed. The general syntax is as follows:

INIT = IOPORT (address) list

Where the address parameter is the address of the desired single I/O port and the list is as in the first general format. As an example, assume the IOPORT(1) statement of the previous example referenced the port at 0Z380h. The example is then:

```
LINK
    DMA = 3 | 4
    INIT = IOPORT (0Z380h) xxxx1xxx | xxxx0xxx
```

The INIT statements for switch programmable and jumper programmable boards are similar and include a switch/jumper identification block. The following figure shows the general syntax of the optional INIT statement for switch and jumper programmable boards.

```
INIT = SWITCH(i) LOC(switchlist) list
INIT = JUMPER(i) LOC(jumperlist) list
```

The SWITCH(i) or JUMPER(i) field indicates which switch or jumper group is being initialized. The LOC parameter indicates which switches within the set or which jumpers are being described. The list field describes the way the switches or jumpers should be set. A 1 indicates that a switch is in the ON position, a 0 indicates the switch is in the OFF position and an X indicates a don't care condition. Jumper settings are as previously described based on the type of the jumper. An example of a switch initialization of a PORT is shown below.

```
LINK
    PORT = 300h-30Fh STEP = 4
    INIT = SWITCH(1) LOC(1 2) 00 | 01 | 10 | 11
```

The PORT statement has four possible configurations and switches 1 and 2 of SWITCH(1) are used to set the configurations, as shown in the following table.

| Port Range | SW. 1 | SW. 2 |
|---|---|---|
| 300h-303h | OFF | OFF |
| 304h-307h | OFF | ON |
| 308h-30Bh | ON | OFF |
| 30Ch-30Fh | ON | ON |

An INIT statement also exists to relate a SOFTWARE statement. The general syntax is:
INIT = SOFTWARE (i) list
where SOFTWARE (i) defines the previously defined SOFTWARE statement and list is a text list of parameters passed to the SOFTWARE statement for display. This allows the user to be informed of the necessary settings for use in the CONFIG.SYSTEm or AUTOEXEC. BAT files. An example follows:

```
SOFTWARE(1) = "The Network Adapter is initialized
using the program  n NET.EXE. The following command
should be placed in  n your AUTOEXEC.BAT file: NET /I=X
/D=y where"
    LINK
        IRQ = 3|4|5
        INIT = SWITCH(1)LOC(1 2) 00 | 01 | 10
        INIT = SOFTWARE(1) "x is 3" | "x is 4" | "x is 5"
    LINK
        DMA = 2 | 5
        INIT = SWITCH(1)LOC(3) 0 | 1
        INIT = SOFTWARE(1) "y is 2" | "y is 5"
```

If the configuration means determines that the board is to be at interrupt line 3 and DMA channel 2, the following display is presented.

```
The Network Adapter is initialized using the program
NET.EXE. The following command should be placed in
your AUTOEXEC.BAT file: NET /I=x /D=y where
    x is 3
    y is 2
```

As previously mentioned, Resource Statements and INIT statements are related into groups within each CHOICE. The groups can be LINKed, COMBINEd or FREE form. A linked group is for Resource statements which switch together when a setting is changed. A combined group is used when the INIT statement encompasses all combinations of the resource statements in the group. In a free form group the Resource and INIT statements are completely unrelated. Grouping information must be provided for Resource and INIT statements. Default conditions of linking INIT statements to the previous Resource Statement or having everything free form are possible, but are not considered preferable because of resulting complexities in the configuration means.

In a linked group each statement, Resource and INIT, must have the same number of options specified in the list. The options are then treated as having a one-to-one correspondence with the same option number in the other linked statements. The general syntax is as follows:

```
LINK
    Resource statements
    INIT statements
An example is as follows:
LINK
    IRQ = 3 | 4
    DMA = 2 | 5
    INIT = IOPORT(1)xxxxxx10 | xxxxxx01
```

In this example, choosing the first initialization value of xxxxxx10 results in IRQ line 3 and DMA channel 2 being used, while DMA channel 5 and IRQ line 4 are used in the second case.

In a combined group values for every combination of options legally possible from all the resource statements are provided for in the INIT statements. This group type is used primarily for memory functions with the MEMORY and ADDRESS statements. The general syntax and an example follow:

```
COMBINE
    Resource Statements
    INIT Statements
COMBINE
    MEMORY = 1M | 2M
    ADDRESS = 1M | 2M
    INIT = IOPORT(2) 00xxxxxx | 01xxxxxx |
        10xxxxxx| 11xxxxxx
```

In the example, the first value in the INIT statement list is used to configure for 1 Mbyte of memory starting at an address of 1 Mbyte. The second INIT value is used for 1 Mbyte of memory starting at address 2 Mbyte, with the third and fourth INIT values representing the values for 2 Mbytes of memory starting at 1 Mbyte and 2 Mbytes of memory starting at 2 Mbyte. Thus the first value of the first Resource Statement is used until all following Resource Statement values have been used, and then the second value of the first Resource Statement is used, and so on until all the combinations have been tried.

A more complex example and the resulting memory amount, start address and value table are shown below:

```
COMBINE
    MEMORY = 1M | 2M
    ADDRESS = 1M 4M STEP = 1M
    INIT = IOPORT(1)xxxxx000 - xxxxx100
```

| Memory Amount | Starting Address | Port Value |
|---|---|---|
| 1M | 1M | xxxxx000 |
| 1M | 2M | xxxxx001 |
| 1M | 3M | xxxxx010 |
| 2M | 1M | xxxxx011 |
| 2M | 2M | xxxxx100 |
| 2M | 3M | — |

As can be seen only legal combinations have associated port values. Starting addresses cannot be at 4 Mbyte because of the range specification in the Address Statement. A starting address of 3 Mbyte for 2 Mbytes of memory is not valid because then the address range would exceed the allowed 4 Mbyte upper limit. So only five legal combinations are present and the five INIT values are sufficient.

The final type of grouping is free form, with the following general syntax and an example.

```
FREE
    Resource Statements
    INIT Statements
FREE
    IRQ = 2 | 3 | 4
    DMA = 4
    INIT = IOPORT(2) xxxx1010
```

In the above example the interrupt line can be 2, 3 and 4 and no initialization information is needed by the configuration means. In this case selection of the appropriate interrupt line is assumed to be done by an independent program. Also in the example, only DMA channel 4 can be used and the initialization value indicated in the INIT statement is always performed. Thus each Resource and INIT statement is independent of the others and no linkage is required.

The following is an example showing several of the advanced features previously discussed.

```
IOPORT(1) = 0Z280h
    INITVAL = 11100XX
IOPORT(2) = PORTVAR(1) ;Variable port
    INITVAL = XXXX10xx
FUNCTION = "Serial Port"
    SUBFUNCTION = "PORT NUMBER"
        CHOICE = "COM1"
            PORTVAR(1) = 3F9h
            LINK
                PORT = 3F0h-3FFh
                INIT = IOPORT(1) XXXXXX01
        CHOICE = "COM2"
            PORTVAR(2) = 2F9h
            LINK
                PORT = 2F0h-2FFh
                INIT = IOPORT(1) XXXXXX10
    SUBFUNCTION = "Baud Rate"
        CHOICE = "1200"
            FREE
                INIT = IOPORT(2) 1001XX00
        CHOICE = "2400"
            FREE
                INIT = IOPORT(2) 1001XX01
```

In the above example, the I/O port used to initialize the baud rate is dependent upon whether the serial port is selected as COM1 or COM2. The use of SUBFUNCTIONs allows the serial port to be simply configured and the use of the PORTVAR(j) feature allows a simpler reference for dependent values.

In the preferred embodiment, the system board manufacturer provides a means for storing the configuration information, such as battery powdered CMOS RAM, to provide the initialization sequence a location to uniformly retrieve the programmable configuration information which is then written to the boards.

Turning now to the means and method for determining the configuration files and configuring the boards and system, the invention is arranged so that the user can configure the user's computer system and circuit boards by using either the user's own system, in whole or in part, before any optional circuit boards are installed, or the configuration information may be determined on another computer and quickly installed into the user's system. The second arrangement provides for the vendor or a central office to efficiently configure a multiplicity of other systems.

In the preferred embodiment of the present invention, a computer program, interacting with person performing the configuration, referred to as the system integrator, determines a configuration file for each board to be inserted. As described above, the configuration file contains the one or more designated patterns for access to common computer system resources from which one pattern must be selected to accommodate each circuit board to be inserted in the system, as well as circuit board I/O address and initialization values. In the preferred embodiment, the program automatically selects a pattern for each circuit board so that the user's utilization of circuit boards in the system is maximized according to the user's specification. It is anticipated that the user's favored specification is to accommodate all boards if possible. The program then the stores configuration information based on the selected patterns and values for use in running the user's computer system. The storage may be in the system's non-volatile memory if the user is configuring the user's own system. The storage alternately, or in addition, may be in a system definition information file to be later transferred to the system's non-volatile memory.

In the preferred embodiment of the present invention one computer program performs the three functions of determining the available options and settings, selecting a satisfactory set of options and setting and storing the resulting configuration information.

The program can be entered one of two ways, either to configure the computer system the program is running on or to configure a different computer system. In the first case, the command CF is entered at step 98 (FIG. 1). Control then proceeds to step 100 where the microprocessor reads the configuring system's own non-volatile memory, such as a battery powered CMOS RAM. If the system determines in step 102 that the data in the CMOS RAM is valid, indicating that the CMOS RAM has been previously configured and that the battery has not died, control proceeds to step 108. In step 108 the system accesses the various address locations where a board's identifier information would be stored if the board utilizes an addressing method that is slot specific and contains an identifier to determine what boards are present in which slots that utilize slot specific addressing. Additionally in step 108 the system reads the board configuration files that exist relating to the user's present system. Following this, control proceeds to step 110.

If the system in step 102 determines that the data in the CMOS RAM is not valid, for example because it has not been previously configured or the battery voltage has become too low, then control proceeds to step 104 where the system reads the system definition information file. In step 105 the system determines if the system definition information was valid. If not, for example because the file does not exist or has incorrect data, control proceeds to step 108. If the system definition information is valid, control proceeds to step 106, the system loads this information and uses it to provide default values for use in later options. Control then proceeds to step 108.

From step 108 control proceeds to step 110. In step 110, the system displays the known information about the installed boards and used slots. Control then proceeds to step 112 where a menu of options is presented. Depending upon the situation, the integrator selects between the options of viewing, creating/modifying, perform other options, configuring, obtaining help and exiting.

Figure 1A:
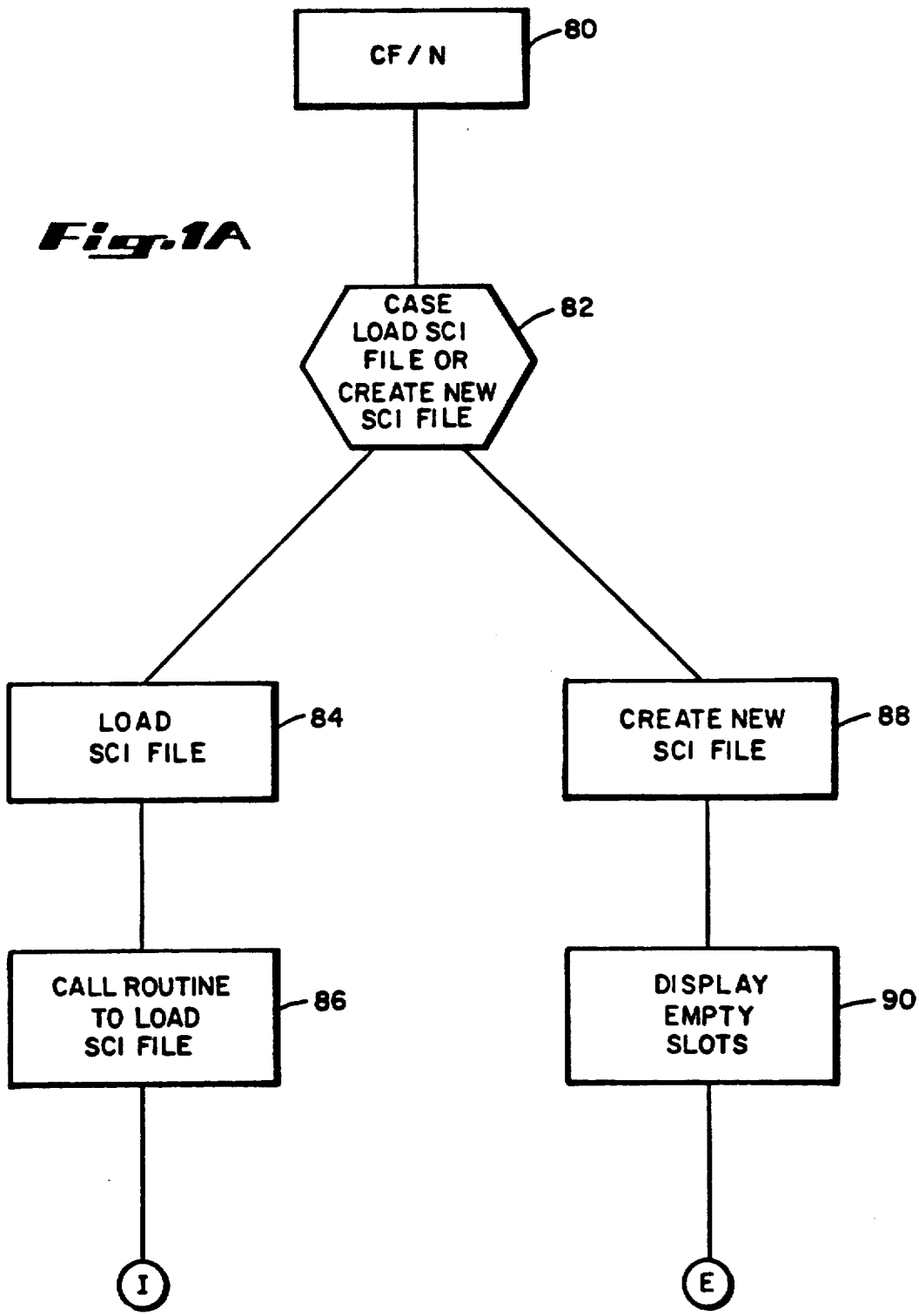

The alternate path for starting the program is to enter the command CF /N, the /N being a switch to indicate that the configuration is not being done for the computer system running the program. The command is entered at Step 80 (FIG. 1A). Control proceeds to Step 82 where an option menu is presented to allow the integrator to select whether an existing or system definition information (SDI) file is to be loaded or a new SDI file is to be created. If the selected option is loading a file, control proceeds to step 84 and to step 86, where the SDI file is loaded by a separate routine which determines from the integrator the desired path for the file, at which time the file is loaded. Control then proceeds to step 110.

If a new SDI file is being created, control proceeds to step 88 to commence operation and then to step 90, where the system displays an empty slots configuration, unlike step 110, which displays the information on the installed boards, used slots and remaining empty slots. Control proceeds from step 90 to step 112.

The preferred embodiment of the present invention provides the integrator the option of reviewing, using a display, the configuration files for boards that are associated with certain slots in the system definition information file. The integrator selects the view option and control proceeds to step 200 (FIG. 2) where the view option commences. The integrator then in step 202 selects a slot whose information is to be viewed. If the system definition information file determines that the selected slot is empty, as determined by the system in step 204, an appropriate message is displayed in step 206 and control returns to step 112. On the the other hand, if the existing system definition information file indicates that that slot has been assigned a board, the system proceeds to step 208 where it determines whether a configuration file exists for the board. If a configuration file exists, the system displays the configuration information, including jumper and switch locations, in step 210 and returns to step 112. If the configuration file does not exist, the system proceeds to step 212 where it displays a message indicating that a configuration file was not found and then proceeds to step 214 where the system provides the user the opportunity of loading in a configuration file or indicating a directory where the configuration file may be found, for example a collection or database of configuration files provided by the system manufacturer.

If the system determines in step 216 that a directory name was provided, the system then determines in step 218 if slot 0 is being reviewed. In the preferred embodiment this is considered the system board slot, with circuit boards being located in non-zero slots. If the zero slot is being viewed, in step 220, the system displays a list of available system board configuration files. The integrator selects the desired file and control proceeds to step 224. If a non-zero slot is being viewed, the system in step 222 displays a list of the non-system board configuration files located in that directory for selection by the integrator. After a selection is made, control proceeds to step 224.

Control proceeds to step 224 after a configuration file is located in steps 214, 220 or 222. In step 224, the system loads the configuration file and displays the information in step 226. Control then returns to step 112.

Figure 3A:
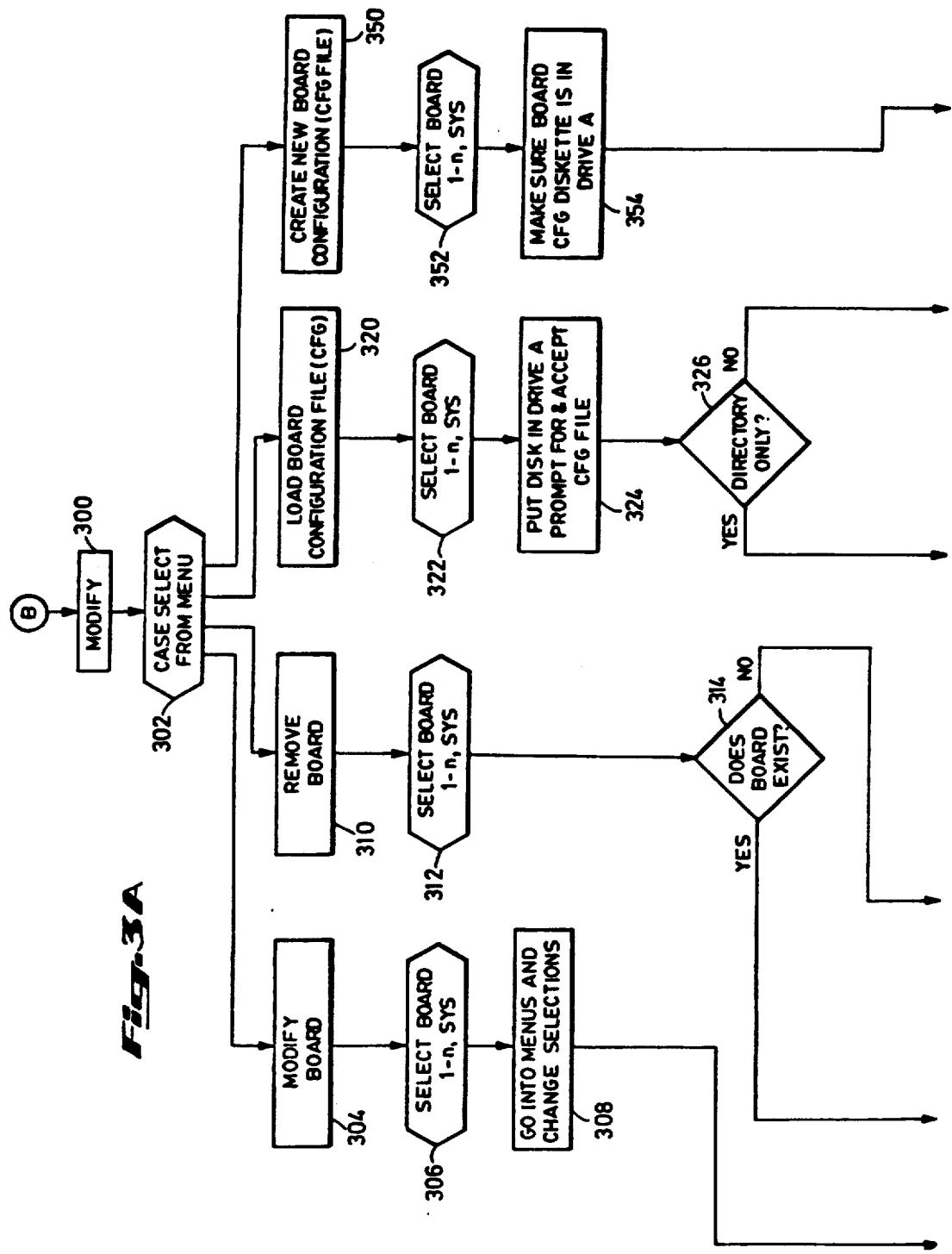

If the integrator is performing the configuration procedure on the system being configured, either for the first set up, or if the integrator desires to add a board, delete a board or modify user specifications among choices within a board configuration file, the integrator at step 112 selects the modify option so control proceeds to step 300 (FIG. 3A) where the create/modify option commences. The system presents an option menu in step 302 requesting the integrator to modify or delete a board, load a configuration file or create a configuration file. If the integrator is adding a board for which there is a manufacturer supplied configuration file, control proceeds to step 320.

The integrator proceeds to specify the slot into which the board will be loaded in step 322. In steps 324-332 (FIGS. 3A and 3B), the integrator selects a location for obtaining configuration information as in steps 214-222.

In step 336 (FIG. 3B), The integrator now inserts a board configuration file diskette into the system. The board configuration file diskette contains all of the configuration information and files for boards installed or to be installed in the system.

The system commences to copy the loaded configuration file to the board configuration diskette in step 338 by first determining in step 340 if a duplicate file already exists. If not, in step 348 the loaded file is written onto the diskette and control returns to step 112.

If a file by the same name does already exist, the integrator is given the options of changing the loaded file's name in step 346, overwriting the existing file in step 344 or aborting in step 342. If overwriting or a change of name is selected, control proceeds to step 340 where the loaded file is copied to the diskette and then to step 112. If the abort option was selected, control proceeds directly to step 112.

If the integrator wishes to add a board for which there is no manufacturer supplied configuration file and which configuration file is not contained in the system collection, the integrator selects the modify routine to create a new board configuration file, which commences at step 350. The integrator indicates the slot into which the board will be installed in step 352. The integrator makes certain that the board configuration file diskette is inserted in the system in step 354 to receive the new file. The system proceeds to step 356 where the system provides default values for use in a template. The template with the inserted default values is displayed in step 360. Control then proceeds to step 362 where a utility routine described below is used to create the other required elements of a configuration file and to modify the defaults displayed. Upon completion of the creation of a new configuration file in the utility procedure, control returns to step 364 where the new file is stored on the board configuration file diskette.

Had the integrator desired to delete a board from a configured system in step 112, control proceeds to step 310 where the delete option commences and to step 312. In step 312 the integrator indicates the slot of interest. The system then determines if a board exists in that slot in step 314. If no board exists in the desired slot in step 318, an appropriate message is displayed to the integrator and control is returned to step 112. If a board exists in the selected slot, the system confirms in step 315 (FIG. 3B) that the integrator wishes to remove to board. If not, control proceeds to step 112. If so, the system deletes the board in step 316 and control then returns to step 112.

If the integrator wishes to change the user's specifications or choices in the function resource area of a configuration file, control proceeds from step 112 to step 304 where the modify board option commences. The integrator specifies to the system the slot of the board which he wishes to modify in step 306. By recourse to the board configuration file diskette, the system presents in step 308 the configuration file of the board in the slot selected by the integrator. The integrator indicates the choices in this configuration file that the he wishes to change. When all the changes have been made, control returns to step 112.

This series is performed until all the boards have configuration files or information present on the board configuration file diskette.

Figure 4:
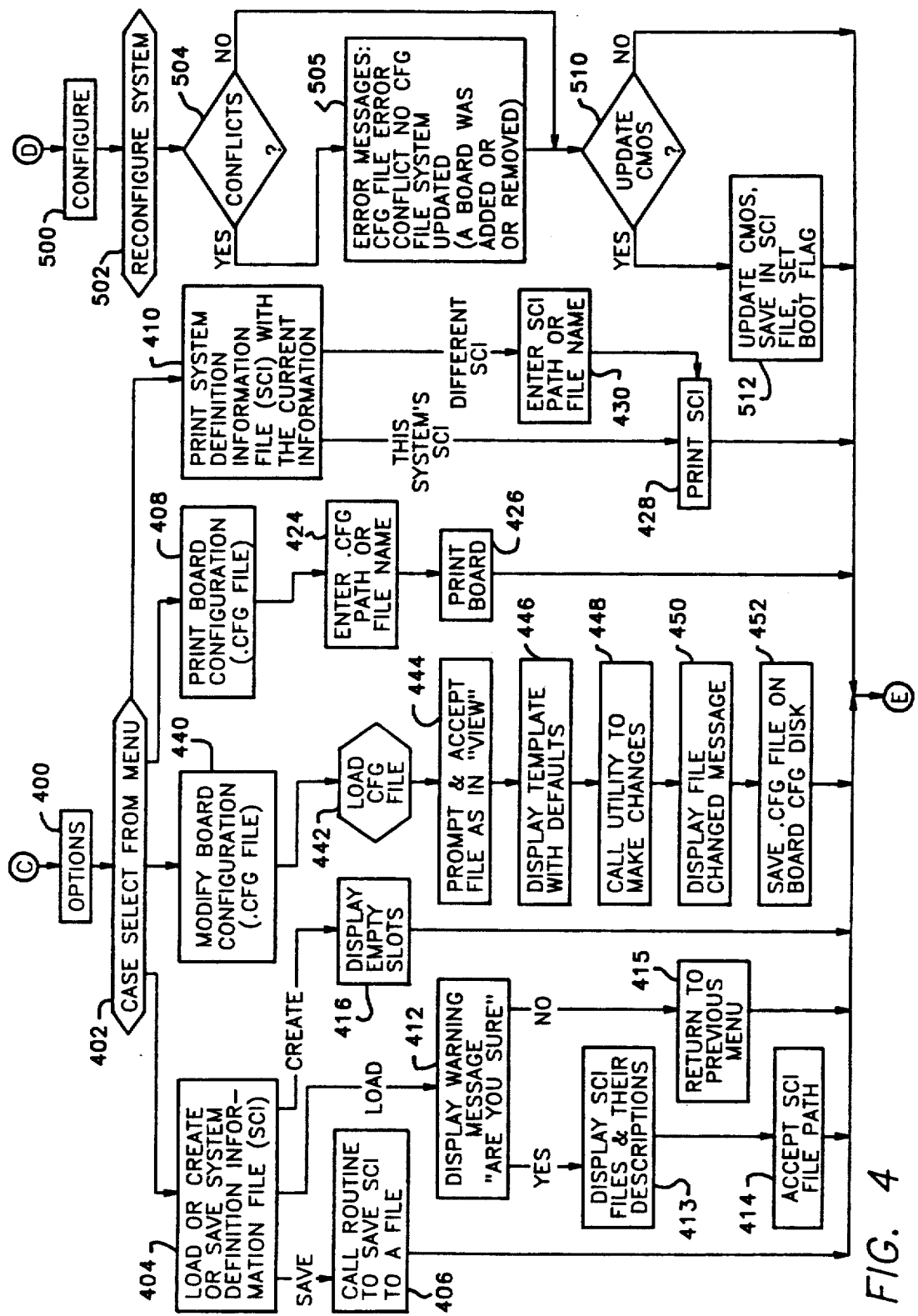

When the integrator has stored on the board configuration file diskette a configuration file or information for all boards that the integrator wishes to configure in the computer system, the integrator selects the configure option and control proceeds to step 500 (FIG. 4) where the configuration option actually commences. Based on the stored board configuration files, the system configures the options in step 502 by cycling through all the choices indicated and the order indicated in the function resource fields of the configuration files. The system selects the first option in each case and determines if a conflict exists. If so, the system then begins to use other options until either a non-conflicting set appears or all combinations have been tried. If the program finds a selection of choices for each board, such that the requirement for common computer system resources can be met for all circuit boards designated without conflict, the system proceeds to step 510 where the system requests the integrator to indicate whether he desires to update the CMOS RAM and save the configuration information in a system definition information file of the computer system on which he is operating. If the integrator is performing the configuration operation on the system to be configured, the integrator will ordinarily update the CMOS RAM and save the configuration information in the system definition information file. If the integrator is configuring a set of circuit boards on one computer system for use in another computer system, then the integrator will not update the CMOS RAM on the machine that is doing the configuring but will save the configuration information in a system definition file, which is done as a selection from the options function 400.

If the system determines in step 510 that the CMOS RAM was updated, the system proceeds to step 512 where it updates the CMOS RAM, saves the configuration information and sets a flag to boot the system. After the flag is set or if the CMOS RAM was not updated, control proceeds to step 112. If the configuration was successful, the integrator can proceed to the view option 200 and view the various boards which have switches and jumpers to allow proper setting of the jumpers and switches as determined by the program.

If the system cannot allocate common computer system resources to all circuit boards demanded without conflict, the appropriate error message is displayed to the integrator in step 505 and control proceeds to step 510. This path allows the integrator to save configurations where not all the boards are fully activated. By appropriately changing the configuration file information the integrator can prepare several of these partial configurations to allow various configurations to be used when needed. For example, if three boards desire to use the two serial ports available, a series of configurations can be developed which allow two of the three boards to be operated when desired.

Other options may be selected by the integrator in step 112. The other options include loading or creating a new system definition file, modifying a configuration file, printing a configuration file or printing a system definition information file. The system proceeds to step 400 where the other options option commences.

In step 402 the available tasks are selected. If a system definition information file is to be loaded or created, control proceeds to step 404 where the integrator chooses to save, load or create. If the save option is chosen, control proceeds to step 406, where a routine is called which converts the present configuration information into the proper format and stores the converted information in an SDI file. Control then proceeds to step 112.

If the create option is chosen, control proceeds to step 416 where a new file is created and displayed having all slots empty. Control then returns to step 112.

If a system definition information file was to be loaded, control proceeds to step 412 where a question is asked confirming the request. If the request is not confirmed, control returns to step 112. If the request is confirmed, a path to obtain the new file is received in step 414, the new file is loaded, the CMOS RAM is updated, the boot flag set and control proceeds to step 112. This allows a file created on a different system to be loaded into a computer system so that the system can be assembled only one time, not assembled, the configuration process performed, disassembled, properly configured boards installed and reassembled.

If a configuration file is to be modified, control proceeds to step 440 to commence the procedure. A display indicating that a configuration file is to be loaded is presented in step 442. Step 444 then obtains the file using procedures similar to those of steps 214 to 224 relating to viewing a configuration file. Control then proceeds to step 446, where the retrieved information is displayed, with default values appearing at the remaining locations. In the next step, step 448, the utility previously referenced in step 362 is called to make any necessary changes to the configuration information. In step 450 a message is displayed to remind the integrator that the configuration file has been changed, and then control proceeds to step 452. In step 452 the configuration file is stored onto the configuration diskette. Control proceeds to step 112.

If in step 402, the integrator desires to print a configuration file, control proceeds to step 408 to commence the procedure. In step 424 the proper way to obtain the file is requested and the file is printed in step 426, after which time control returns to step 112.

The integrator may also print information in a system definition information file. Control proceeds to step 410 where the process commences. If the present systems file is to be printed, control proceeds to step 428 where the file is printed and to step 112. If a different system file is to be printed, control proceeds to step 430 where the proper way to obtain the file is obtained and then proceeds to step 428.

Figure 6:
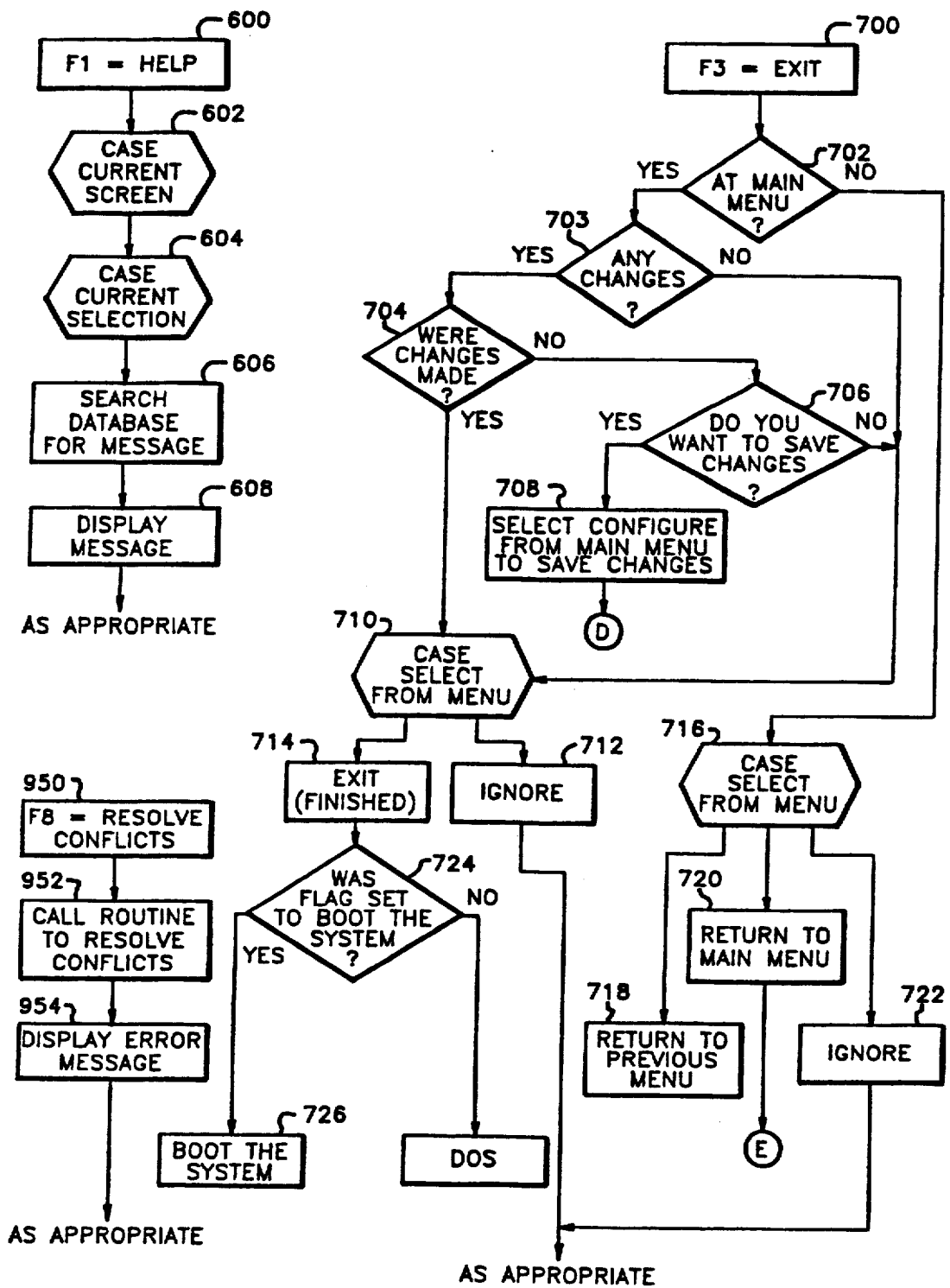

At any time the integrator may request help information from the system. When the F1 key, or other designated key, is depressed, control proceeds to step 600 (FIG. 6) where the help message process starts. The system in 602 determines the screen being presented. Then in step 604 the selection or line on which the cursor rests is determined, the help message database is searched in step 606 and the appropriate message displayed in step 608. Control then returns to wherever it was prior to entering the help process.

The integrator may also select to exit a procedure at any time by pressing the F3 key, or other suitable, designated key. Control proceeds to step 700 where the exit process commences. The system then determines in step 702 if the main menu of step 112 was being displayed. If so, control proceeds to step 703 where the system determines if any changes were made. If not, control proceeds to step 710. If so, control proceeds to step 704. In step 704 the system determines if the changes were saved. If so, control proceeds to step 710 where the integrator is given the option of exiting or ignoring the request to exit. If the choice is to ignore, control returns to step 112. If an exit is to be performed, control proceeds to step 724 where a check of the boot flag is made. If set, the system is rebooted or reinitialized in step 726. If the flag was not set, control exits the configuration program and proceeds to the operating system.

If any changes made were not saved, control proceeds from step 704 to step 706, where the integrator is queried as to whether he wishes to save the changes. If not, control proceeds to step 710. If so, control proceeds to step 500 and the configure option commences.

If the exit key was hit and the main menu of step 112 was not present, control proceeds from step 702 to step 716 where the integrator is given the option of ignoring the key stroke, returning to step 112, or returning to the last previously presented menu or option set. If the key stroke is to be ignored, control proceeds to step 722 and to the step operating upon entry to the exit procedure. If the main menu was requested, control proceeds to step 720 and to step 112. If a return to a previous menu is desired, control proceeds to step 718 and then to the appropriate step.

The integrator may also select to attempt to resolve conflicts at any time. This is especially useful if any resolvable conflict was determined and the integrator has modified a board, for example by changing a CHOICE. The integrator can then simply see if the change resolved the conflict. The integrator presses the F8 key and control proceeds to step 950 where the conflict resolution process commences. Control proceeds to step 952 where the routine utilized and previously discussed in step 502 is called to determine if a conflict exists. Control returns from the conflict routine to step 954, where a message is displayed if an unresolvable conflict still exits. Control then proceeds to the previously presented menu or option set.

Reference was made in step 362 to a utility to create a board configuration file by augmenting and modifying a supplied template with parameter default values. This utility is illustrated in FIGS. 5A-5E. The utility commences at step 800 (FIG. 5A) where the system displays a screen which describes the configuration of the board. Control proceeds to step 802 where the board identification portion commences. The system indicates in step 804 that the integrator is to fill in or modify the appropriate selections. The board identification block is displayed in step 806 and the necessary additions or changes are made.

Control then proceeds to step 808 where the system indicates that the integrator will now be able to add or modify a function statement or identification definition. Control proceeds to step 816 where the function or identification choice is requested.

Assuming the integrator chooses to add or modify a function statement block, control proceeds to step 840 (FIG. 5C), where the option commences. The integrator is informed in step 842 to modify or add the appropriate information to the information displayed in step 844, the required and optional statements in the FUNCTION statement other than Resource and INIT statements. After appropriate operations on the FUNCTION, TYPE, COMMENTS and HELP statements in step 844, control proceeds to step 850.

In step 850 the integrator is informed that he will next be modifying or creating a new choice. Then in step 852, the system requests the integrator to modify or create the choice name, as appropriate. In step 853 the integrator is informed to modify or add the appropriate information to the information relating to the CHOICE statement displayed in step 854. The integrator is next informed in step 855 that he will next be modifying or creating a grouping of the Resource and INIT statements. The various groupings are displayed in step 856 (FIG. 5D) and the integrator chooses one. Control then proceeds to step 857 where the system requests the resources to be used in that CHOICE.

Figure 5A:
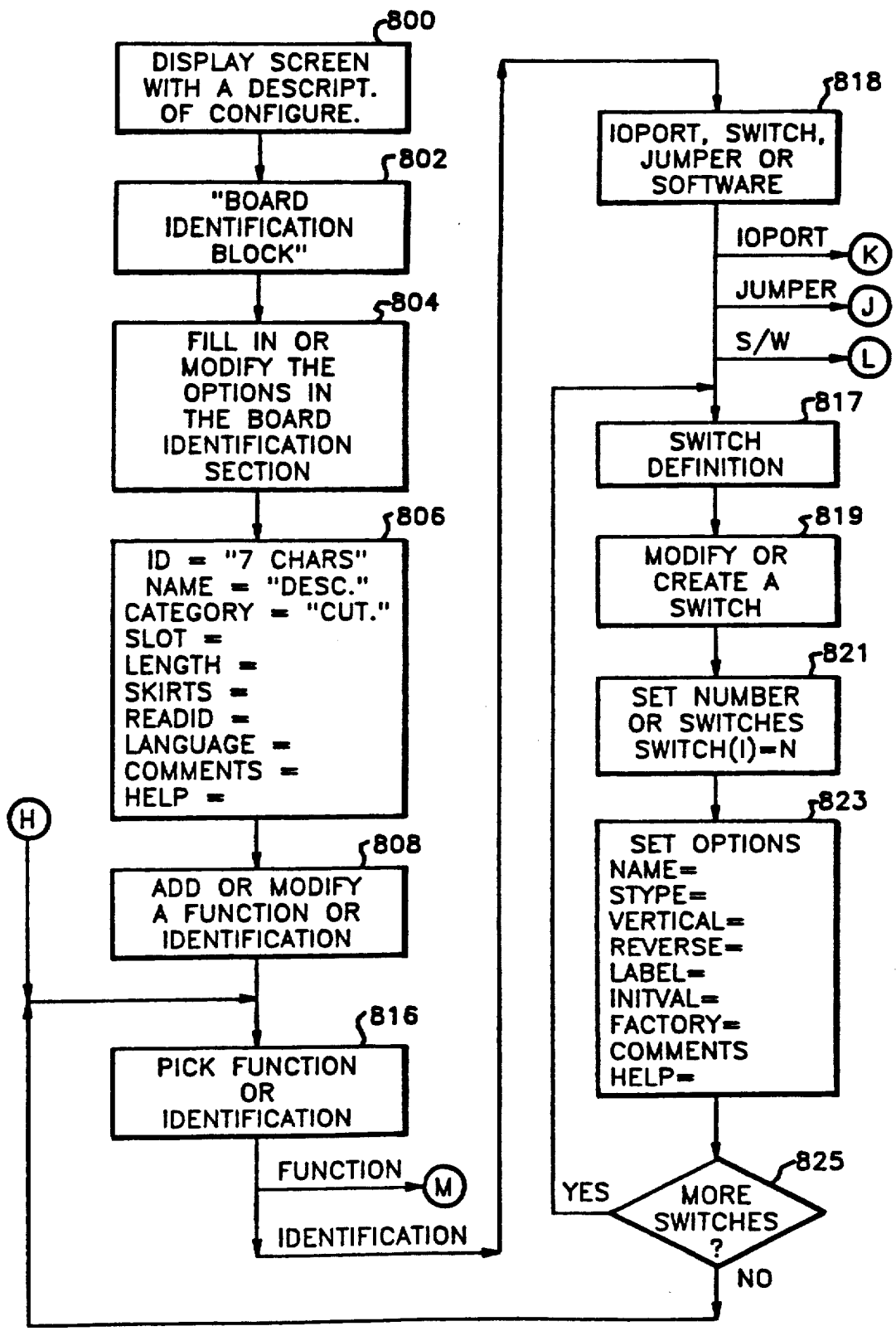
FIGS. 5A, 5B, 5C, 5D, 5E are flowchart illustrations of portions of the operating sequences and menus of a utility that permits the user to create a configuration file according to the present invention.
Figure 5B:
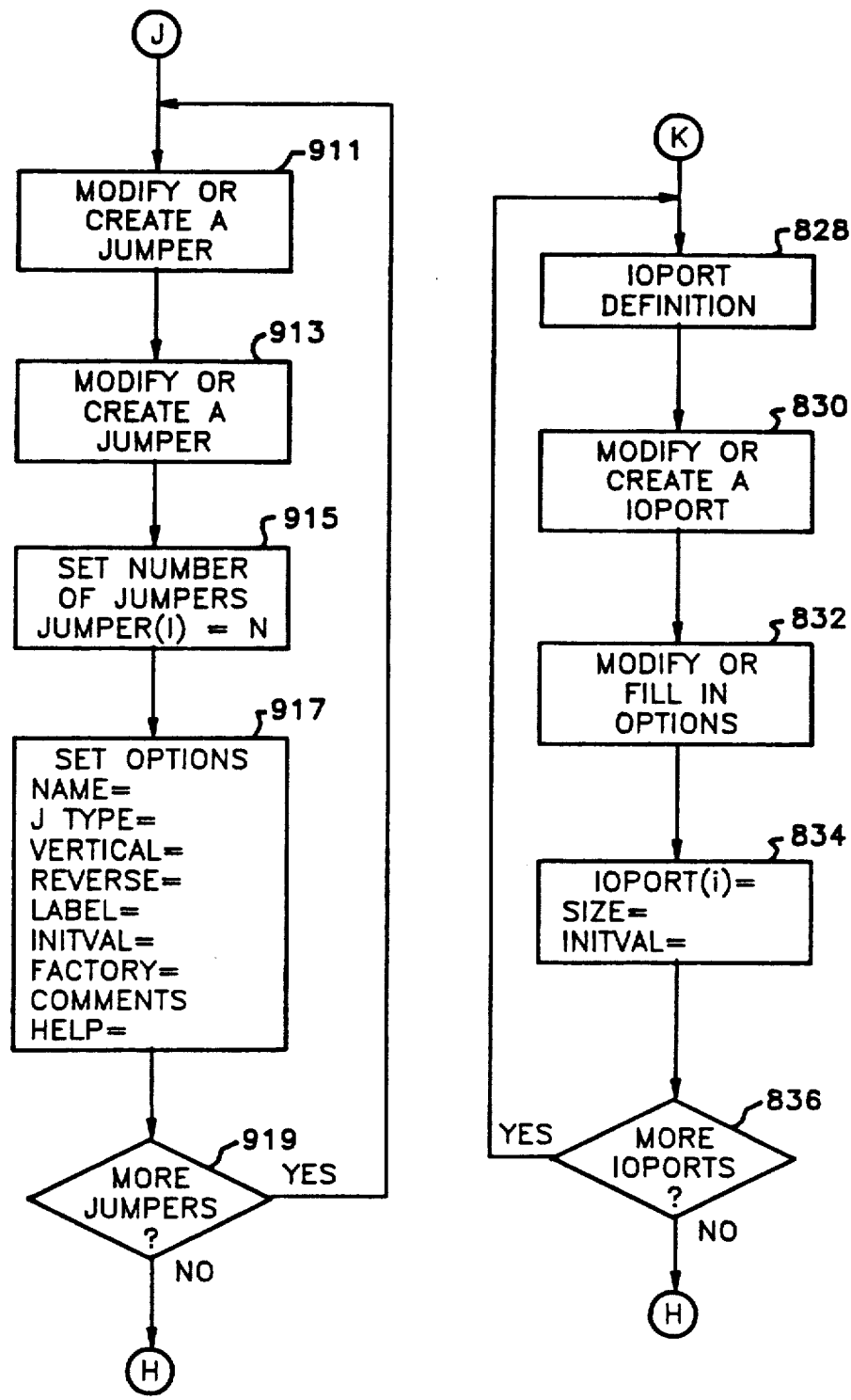
Figure 5C:
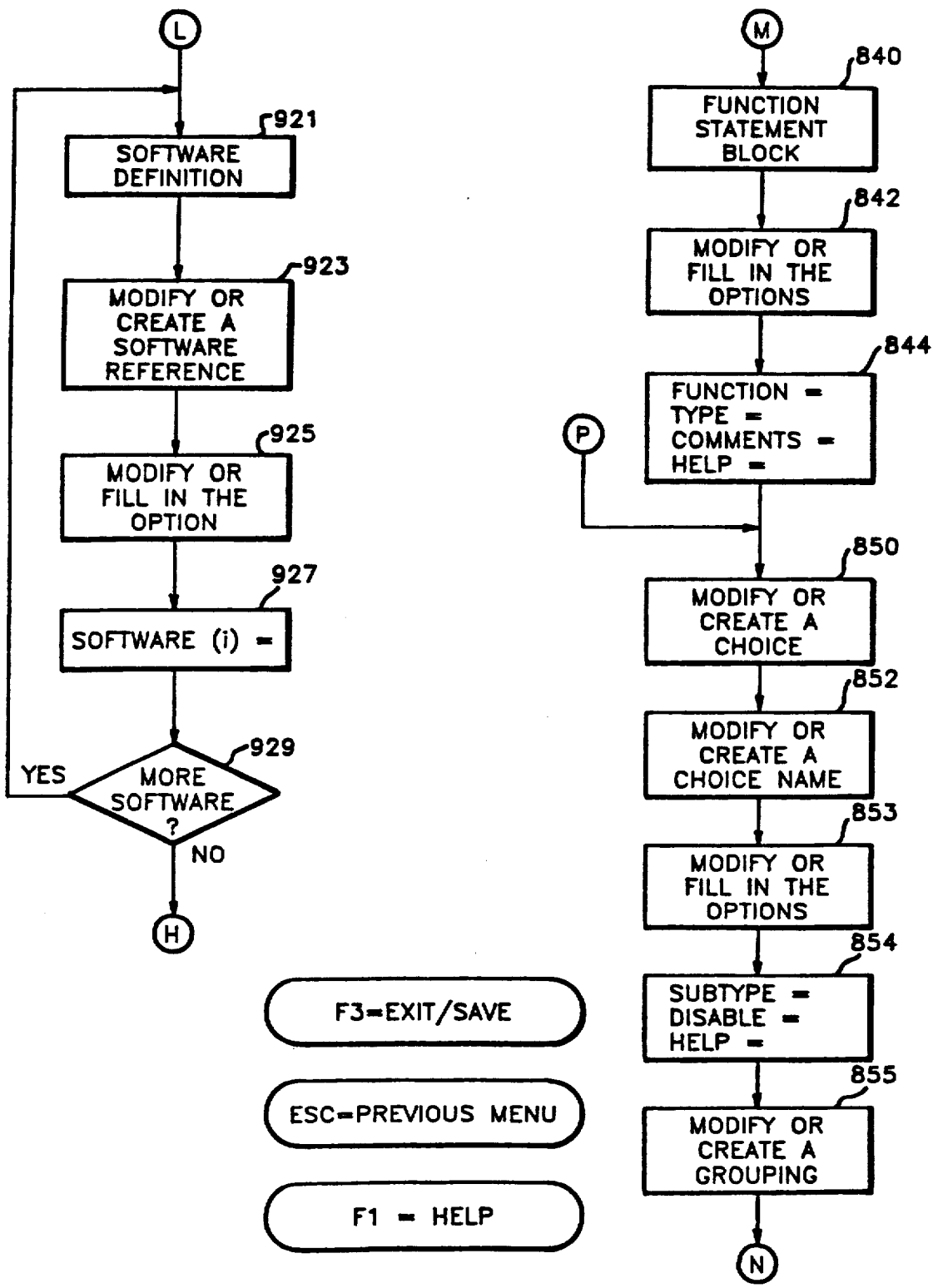
Figure 5D:
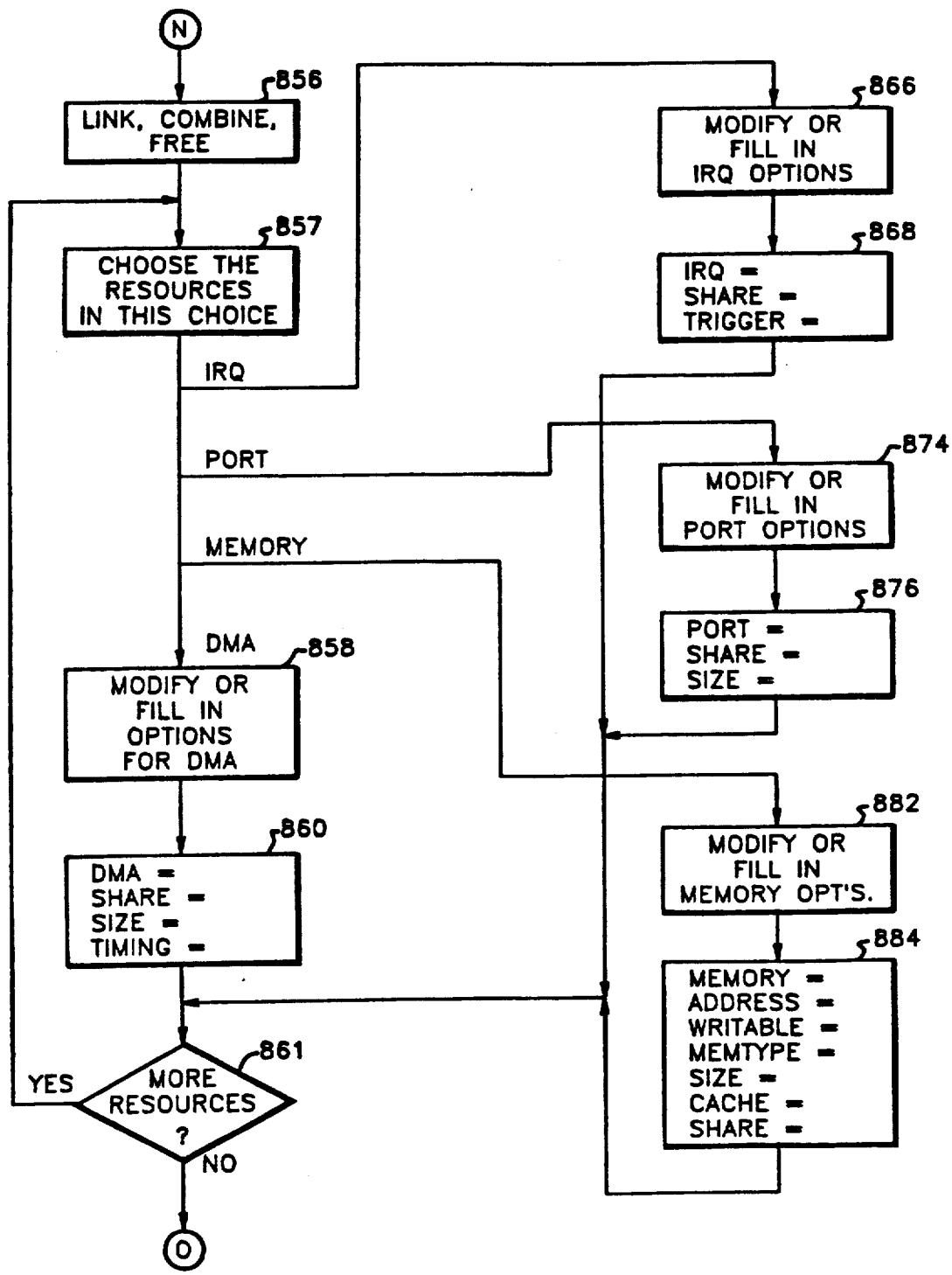
Figure 5E:
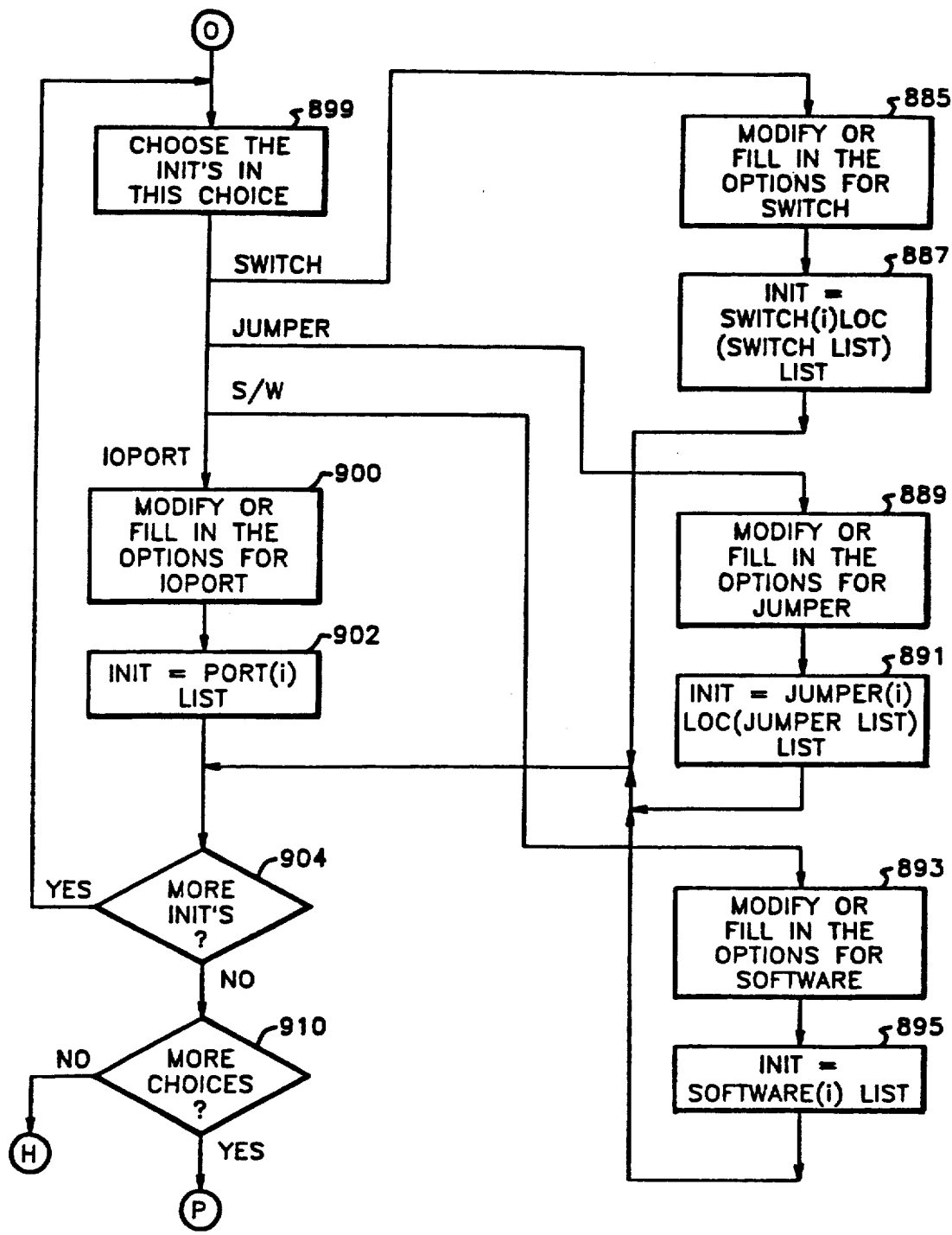

If a DMA channel was to be added, control proceeds to step 858 where the integrator is prompted to modify or add the information needed for the DMA statement. In step 860 the various options are displayed and the integrator adds or modifies as necessary. Control then proceeds to step 861 to see if any more Resource statements are needed. If so, control proceeds to step 857. Otherwise control proceeds to step 899 (FIG. 5E).

If the integrator selected an IRQ statement in step 857, control proceeds to step 866 where the integrator is prompted to modify or add the appropriate information to the items displayed in step 868. After the addition or modification is complete control proceeds to step 861.

If the integrator selected a PORT statement in step 857 control proceeds to step 874 where the integrator is prompted to modify or add the appropriate information to the items relating to the PORT statement displayed in step 876. After completion control proceeds to step 861.

If the integrator selected a MEMORY statement in step 857, control proceeds to step 882. In step 882 the integrator is requested to add or modify, as appropriate, the items displayed in step 884 relating to the MEMORY statement. Control proceeds to step 861.

After completion of all resource statements, step 899 prompts the integrator to request the desired INIT statement. If an I/O port is to be initialized, control proceeds to step 900 where the system prompts the integrator to modify or add information to the IOPORT INIT statement displayed in step 902. Control then proceeds to step 904 where a determination is made if any more INIT statements are necessary. If so, control returns to step 899. If not, control proceeds to step 910, where a determination of whether any more choices are desired is made. If more choices are to be made, control proceeds to step 850. Otherwise control returns to step 816.

If at step 899 the integrator choose to develop a switch initialization, control proceeds to step 885. In step 885 the integrator is requested to modify or add information to the items displayed in step 887 to complete the switch initialization. Control proceeds when completed to step 904.

If the integrator choose to initialize a jumper in step 899, control proceeds to step 889. In step 889 a prompt is displayed so that the integrator will add to or modify the items displayed in step 891. When the jumper initialization is completed, control proceeds to step 904.

If the integrator choose the remaining initialization choice, software, control proceeds to step 893 where a display is presented which requests the integrator for the information to be added or modified in the items displayed by step 895. Control proceeds upon completion to step 904.

If at step 816 identification was requested, control proceeds to step 818 where the integrator chooses whether an I/O port, a switch, a jumper or software is being identified. If a switch is being identified, control proceeds to step 817 where the switch identification procedure commences. In step 819 the integrator is requested to add or modify information in the items displayed in steps 821 and 823 to complete the SWITCH statement. Control proceeds to step 825 to determine if more switches are to be identified. If so, control returns to step 817. If not, controls returns to step 816.

If a jumper is being identified, control proceeds to step 911 (FIG. 5B) where the procedure commences. In step 913 the system requests the integrator to complete the items displayed in steps 915 and 917, thus forming a JUMPER statement. After the JUMPER statement is completed control proceeds to step 919 to determine if more jumpers are to be identified. If not, control proceeds to step 816 while if more Jumpers are to be defined, control returns to step 911.

The third available option at step 818 is to define identification values of a port or I/O address location. The procedure starts at step 828. In step 830 the integrator is informed that an I/O port is being identified, with the appropriate information being modified or added in steps 832 and 834. For the following step 836, the integrator indicates if another I/O port identification is to be performed. If so, control returns to step 828; if not, control returns to step 816.

If the fourth option, identifying a software reference was desired, control proceeds from step 818 to step 921, where the procedure commences. In steps 923 and 925 the integrator is prompted that a software reference is being defined and the integrator is to add to or modify the information displayed in step 927 to complete the SOFTWARE statement. After completion control proceeds to step 929 to determine if another software reference is needed. If so, control returns to step 921, otherwise control returns to step 816.

The utility procedure can be exited at any time by hitting the F3 key as indicated by balloon 810. A procedure similar to that of the exit procedure commencing at step 700 is performed. Similarly, the help function 814 is also available.

The above utility has been shown utilizing only the basic features of the configuration information file, not the advanced features discussed. The advanced features could be included but the preferred embodiment is as disclosed because this simplifies the utility and allows it to work better with the majority of integrators that will use the utility. A configuration file having the advanced features is expected to be developed using a standard text editor, a not undue burden for advanced integrators.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

What is claimed is:

1. For use with a computer system that provides for circuit boards to be interchangeably inserted in a plurality of system slot locations, with the circuit boards having the capability to be configured to utilize one or more of various common computer system resources, a method for configuring the system and boards comprising:

the computer determining the various common computer system resources which can be utilized by the circuit boards to be inserted into the computer system;

wherein the computer in determining the various common computer system resources utilizes a circuit board configuration file having a defined configuration file format for indicating the various common computer system resources which can be utilized by a circuit board and for indicating the identification of the circuit board;

wherein the format of said configuration file provides for board identification information, initialization information and function information;

wherein said function information includes information on the various functions available on the circuit board and the resources necessary for each function;

wherein said resource information includes information on the direct memory access channel, interrupt line, input/output port address and memory address options available on the circuit board;

the computer resolving conflicts as to the common computer system resources to be utilized by the circuit boards to be installed in the computer system;

the computer allocating common computer system resources, based on the resolution of conflicts, to be utilized by the circuit boards installed in the computer system; and the computer storing configuration information for each circuit board based on the allocated common computer system resources to be utilized.

2. For use with a computer system that provides for circuit boards to be interchangeably inserted in a plurality of system slot locations, with the circuit boards having the capability to be configured to utilize one or more of various common computer system resources, a method for configuring the system and boards comprising:

the computer determining the various common computer system resources which can be utilized by the circuit boards to be inserted into the computer system;

wherein the computer determining the various common computer resources utilizes a circuit board configuration file having a defined configuration file format for indicating the various common computer system resources which can be utilized by a circuit board and for indicating the identification of the circuit board;

wherein the format of said configuration file provides for board identification information, initialization information and function information;

wherein said function information includes information on the various functions available on the circuit board and the resources necessary for each function;

wherein said resource information includes information on the initialization value options available on the circuit board for direct memory access channel, interrupt line, input/output port addresses and memory addresses;

the computer resolving conflicts as to the common computer system resources to be utilized by the circuit boards to be installed in the computer system;

the computer allocating common computer system resources, based on the resolution of conflicts, to be utilized by the circuit boards installed in the computer system; and the computer storing configuration information for each circuit board based on the allocated common computer system resources to be utilized.

3. For use with a computer system that provides for circuit boards to be interchangeably inserted in a plurality of system slot locations, with the circuit boards having the capability to be configured to utilize one or more of various common computer system resources, a method for configuring the system and boards comprising:

the computer determining the various common computer system resources which can be utilized by the circuit boards to be inserted into the computer system;

wherein the computer determining the various common computer resources utilizes a circuit board configuration file having a defined configuration file format for indicating the various common computer system resources which can be utilized by a circuit board and for indicating the identification of the circuit board;

wherein the format of said configuration file provides for board identification information, initialization information and function information;

wherein said function information includes information on the various functions available on the circuit board and the resources necessary for each function;

wherein said resource information includes:
information on direct memory access channel, interrupt line, input/output port address and memory address options available on the circuit board;
information on the initialization value options available on the circuit board for direct memory access channels, interrupt lines, input/output port addresses and memory addresses; and
relationship grouping information for said available options and said initialization value options;

the computer resolving conflicts as to the common computer system resources to be utilized by the circuit boards to be installed in the computer system;

the computer allocating common computer system resources, based on the resolution of conflicts, to be utilized by the circuit boards installed in the computer system; and the computer storing configuration information for each circuit board based on the allocated common computer system resources to be utilized.

4. An apparatus for configuring a computer system that provides for circuit boards to be interchangeably inserted in a plurality of system slot locations, with the circuit boards having the capability to be configured to utilize one or more of various common computer system resources, comprising:

means for determining the various common computer system resources which can be utilized by the circuit boards to be inserted into the computer system;

wherein said means for determining includes means for utilizing a circuit board configuration file having a defined configuration file format for indicating the various common computer system resources which can be utilized by a circuit board and for indicating the identification of the circuit board;

wherein the format of said configuration file provides for board identification information, initialization information and function information;

wherein said function information includes information on the various functions available on the circuit board and the resources necessary for each function;

wherein said resource information includes information on the direct memory access channel, interrupt line, input/output port address and memory address options available on the circuit board;

means for resolving conflicts as to the common computer system resources to be utilized by the circuit boards to be installed in the computer system;

means for assigning common computer system resources based on said resolution of conflicts to be installed in the computer systems; and means for storing configuration information for each circuit board based on the assigned common computer system resources to be utilized.

5. An apparatus for configuring a computer system that provides for circuit boards to be interchangeably inserted in a plurality of system slot locations, with the circuit boards having the capability to be configured to utilize one or more of various common computer system resources, comprising:

means for determining the various common computer system resources which can be utilized by the circuit boards to be inserted into the computer system;

wherein said means for determining includes means for utilizing a circuit board configuration file having a defined configuration file format for indicating the various common computer system resources which can be utilized by a circuit board and for indicating the identification of the circuit board;

wherein the format of said configuration file provides for board identification information, initialization information and function information;

wherein said function information includes information on the various functions available on the circuit board and the resources necessary for each function;

wherein said resource information includes information on the initialization value options available on the circuit board for direct memory access channel, interrupt line, input/output port addresses and memory addresses;

means for resolving conflicts as to the common computer system resources to be utilized by the circuit boards to be installed in the computer system;

means for assigning common computer system resources based on said resolution of conflicts to be installed in the computer systems; and means for storing configuration information for each circuit board based on the assigned common computer system resources to be utilized.

6. An apparatus for configuring a computer system that provides for circuit boards to be interchangeably inserted in a plurality of system slot locations, with the circuit boards having the capability to be configured to utilize one or more of various common computer system resources, comprising:

means for determining the various common computer system resources which can be utilized by the circuit boards to be inserted into the computer system;

wherein said means for determining includes means for utilizing a circuit board configuration file having a defined configuration file format for indicating the various common computer system resources which can be utilized by a circuit board and for indicating the identification of the circuit board;

wherein the format of said configuration file provides for board identification information, initialization information and function information;

wherein said function information includes information on the various functions available on the circuit board and the resources necessary for each function;

wherein said resource information includes:

information on the initialization value options available on the circuit board for direct memory access channels, interrupt lines, input/output port addresses and memory addresses available on the circuit board;

information on the initialization value options available on the circuit board for direct memory access channels, interrupt lines, input/output port addresses and memory addresses; and relationship grouping information for said available options and said initialization values;

means for resolving conflicts as to the common computer system resources to be utilized by the circuit boards to be installed in the computer system;

means for assigning common computer system resources based on said resolution of conflicts to be installed in the computer systems; and means for storing configuration information for each circuit board based on the assigned common computer system resources to be utilized.

7. A method for providing information indicative of the various common computer resources which may be utilized by a circuit board installable in a computer system, comprising:

establishing a configuration file, having a defined format, to be accessed by the computer system; and providing resource information in said configuration file pertinent to board identification, initialization and the various functions available on the circuit board and the resources necessary for each function including information on the direct memory access channel, interrupt line, input/output port address and memory address options available on the circuit board.

8. The method of claim 7, wherein said resource information includes information on the initialization value options available on the circuit board for direct memory access channels, interrupt lines, input/output port addresses and memory addresses.

9. The method of claim 8, wherein said resource information includes relationship grouping information for said circuit board available functions and said initialization value options.

* * * * *

UNITED STATES PATENT AND TRADEMARK OFFICE
CERTIFICATE OF CORRECTION

PATENT NO. : 5,263,148

DATED : NOVEMBER 16, 1993

INVENTOR(S) : CURTIS R. JONES, ET AL.

It is certified that error appears in the above-identified patent and that said Letters Patent is hereby corrected as shown below:

In col. 31, line 28, after "computer" please insert --in--.

In col. 31, line 29, after "computer" please insert --system--.

In col. 32, line 61, please replace "channel" with --channels--.

In col. 32, line 61, please replace "line" with --lines--.

Signed and Sealed this

Twenty-sixth Day of April, 1994

Attest:

BRUCE LEHMAN

Attesting Officer

Commissioner of Patents and Trademarks